(12) United States Patent
Chebolu et al.

(10) Patent No.: US 7,290,129 B2
(45) Date of Patent: Oct. 30, 2007

(54) REMOTE ADMINISTRATION OF COMPUTER ACCESS SETTINGS

(75) Inventors: Anil Kumar Chebolu, Atlanta, GA (US); Timothy A. Hill, Kennesaw, GA (US); Marie Louise McMenamin, Marietta, GA (US); Zakir S. Patrawala, Atlanta, GA (US); Samira S. Virani, Atlanta, GA (US)

(73) Assignee: AT&T BLS Intellectual Property, Inc., Wilmington, DE (US)

( * ) Notice: Subject to any disclaimer, the term of this patent is extended or adjusted under 35 U.S.C. 154(b) by 787 days.

(21) Appl. No.: 10/742,142

(22) Filed: Dec. 19, 2003

(65) Prior Publication Data
US 2005/0060581 A1 Mar. 17, 2005

Related U.S. Application Data

(60) Provisional application No. 60/503,333, filed on Sep. 16, 2003.

(51) Int. Cl.
*G06F 9/00* (2006.01)

(52) U.S. Cl. .............. 713/150; 713/155; 713/161; 713/164

(58) Field of Classification Search ............... 713/150, 713/155, 161, 164
See application file for complete search history.

(56) References Cited

U.S. PATENT DOCUMENTS 5,003,595 A * 3/1991 Collins et al. .............. 707/9
5,301,246 A * 4/1994 Archibald et al. ..... 379/142.06

* cited by examiner

*Primary Examiner*—Thomas R. Peeso

(57) ABSTRACT

The present disclosure provides systems and methods for controlling computer access. Briefly described in architecture, some embodiments of such a system provide a control unit for controlling user access to a computer in accordance with a user profile. An administrator of the computer is enabled to remotely access and modify the user profile. The user profile is stored at least in a remote database that is accessible via a server. Other systems and methods are also provided.

24 Claims, 27 Drawing Sheets

FIG. 3

ACCESS CONTROLS

ACCESS CONTROLS STEPS

| STEP 1-B | STEP 2 | STEP 3 | STEP 4 | STEP 5 |
|---|---|---|---|---|
| CREATE ADMIN PROFILE 310 | INSTALL SOFTWARE 315 | LOGIN TO ADMIN PROFILE 320 | SET UP ACCESS CONTROLS 325 | LOGOUT 330 |

FIRST NAME ☐

LAST NAME ☐   ZIP CODE ☐

EMAIL ☐

BIRTHDAY (MM/DD/YY) ☐/☐/☐   ↙ 345

GENDER [SELECT ▼]

[DONE] ─350

FIG. 4

HTTP://HOME.BELLSOUTH.NET/USERINFO/

ACCESS CONTROLS

CREATE A NEW SUB-ACCOUNT

FILL OUT A USER NAME AND PASSWORD AS WELL AS A PASSWORD REMINDER FOR EACH USER YOU WANT TO PROTECT WITH ACCESS CONTROLS.
THE REMINDER QUESTION IS USED IN CASE YOU FORGET A USERNAME AND PASSWORD.

16-20 CHARACTERS.
USE ONLY LETTERS, NUMBERS, AND DASHES

| | |
|---|---|
| USER NAME | ANNIE |
| PASSWORD | ******* |
| RE-ENTER PASSWORD | ******* |
| PASSWORD REMINDER QUESTION | [SELECT ONE QUESTION] ▼ |
| ANSWER | |

HTTP://HOME.BELLSOUTH.NET/USERINFO/

ACCESS CONTROLS

BLOCK/ALLOW SITES FOR ANNIE

YOU HAVE THE OPTION OF TO EITHER ALLOW OR BLOCK PARTICULAR SITES OF YOUR CHOICE FOR THIS USER

PLEASE ENTER THE URL OF THE SITE YOU WANT TO ALLOW OR BLOCK IN THE FOLLOWING FORMAT:
   WWW.SITENAME.COM

ADD HERE:

[ BLOCK THIS SITE ]  1710     1730  [ ALLOW THIS SITE ]

MODIFY HERE:

BLOCKED:
☐ WWW.GAMBLING.COM

ALLOWED:
☐ WWW.BELLSOUTH.COM
☒ WWW.YAHOO.COM 1720                                              1740

[ REMOVE SELECTED SITES ]

1700                                    [ DONE ]

FIG. 17A

```
ACCESS CONTROLS                    1780 ☒

ANNIE

'USENET VIEWER' IS LISTED IN THE 'OTHER
APPLICATIONS' CATEGORY. THE
ADMINISTRATOR HAS RESTRICTED YOU
FROM USING IT.
```

HTTP://HOME.BELLSOUTH.NET/USERINFO/

ACCESS CONTROLS

USER DEFINED SOFTWARE LIST

BELOW IS A LIST OF SOFTWARE APPLICATIONS YOU HAVE ELECTED TO BLOCK. TO CHANGE THIS LIST, "SELECT" THE ITEM YOU WISH TO CHANGE AND THEN CLICK EITHER "UPDATE" TO CHANGE OR "DELETE" TO REMOVE FROM THE LIST.

| SELECT | APPLICATION TYPE | APPLICATION NAME |
|---|---|---|
| ☐ | OTHER APPLICATIONS ▼ | MPEG PLAYER |
| ☐ | NEWSGROUP CLIENT ▼ | USENET VIEWER |
| ☐ | FILE SHARING ▼ | FILESHARER |

[UPDATE]  [DELETE]

[DONE]

ACCESS CONTROLS

VIEW REQUESTS FOR ANNIE

[ RETURN TO CHANGE SETTINGS ]

IF A USER HAS MADE A REQUEST TO CHANGE CONTROL SETTINGS, YOU MAY VIEW THEM HERE

ANNIE HAS REQUESTED PERMISSION TO VIEW THE
FOLLOWING WEBSITE: WWW.MYSCHOOL.COM
  ☐ YES   ☐ NO   ☐ REVIEW LATER

ANNIE HAS REQUESTED PERMISSION TO ACCESS THE
FOLLOWING APPLICATION: INSTANT MESSENGER           1820
  ☐ YES   ☐ NO   ☐ REVIEW LATER

ANNIE HAS REQUESTED PERMISSION TO ACCESS THE
FOLLOWING APPLICATION: NEWS GROUPS
  ☐ YES   ☐ NO   ☐ REVIEW LATER

ANNIE HAS REQUESTED PERMISSION TO ACCESS THE
FOLLOWING APPLICATION: WEB ACCESS
  ☐ YES   ☐ NO   ☐ REVIEW LATER                    1830

[ DONE ]

FIG. 18

Figure 20:
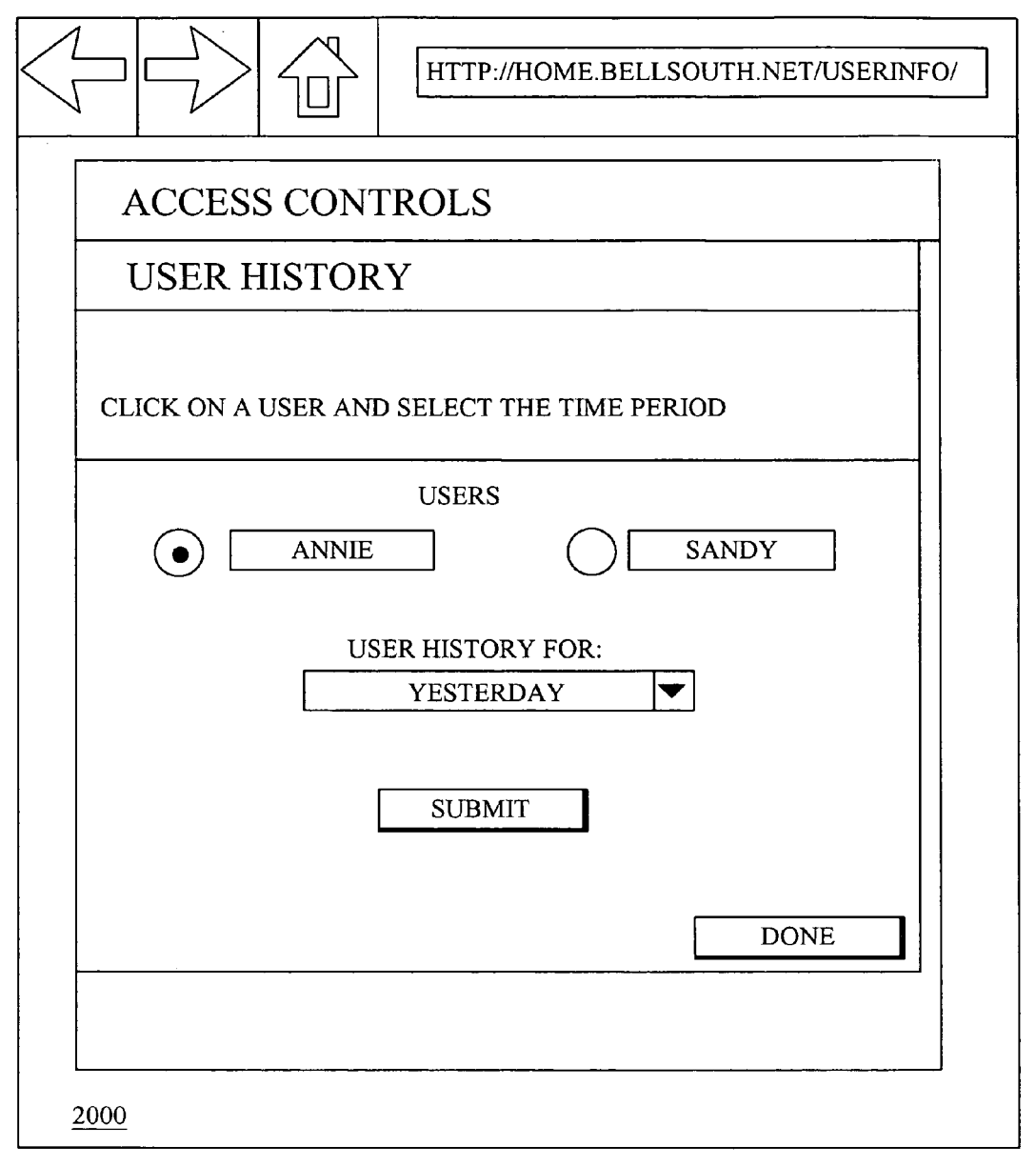

HTTP://HOME.BELLSOUTH.NET/USERINFO/

ACCESS CONTROLS

USER HISTORY

CLICK ON A USER AND SELECT THE TIME PERIOD

USERS

- ( • ) ANNIE
- ( ) SANDY

USER HISTORY FOR:
[ YESTERDAY ▼ ]

[ SUBMIT ]

[ DONE ]

ACCESS CONTROLS

TIME RESTRICTIONS FOR ANNIE

[RETURN TO CHANGE SETTINGS]

SELECT TIMES AND DAYS THAT THE USER HAS ACCESS TO THE INTERNET AND THE APPLICATIONS LISTED BELOW

WEB ACCESS

| | WEB ACCESS | | | | | | |
|---|---|---|---|---|---|---|---|
| | MON | TUES | WED | THUR | FRI | SAT | SUN |
| 12 AM | | | | | | | |
| 11 PM | | | | | | | |
| 10 PM | | | | | | | |
| 9 PM | | | | | | | |
| 8 PM | | | | | | | |
| 7 PM | | | | | | | |
| 6 PM | | | | | | | |
| 5 PM | | | | | | | |
| 4 PM | | | | | | | |
| 3 PM | | | | | | | |
| 2 PM | | | | | | | |
| 1 PM | | | | | | | |
| 12 PM | | | | | | | |
| 11 AM | | | | | | | |
| 10 AM | | | | | | | |
| 9 AM | | | | | | | |
| 8 AM | | | | | | | |
| 7 AM | | | | | | | |
| 6 AM | | | | | | | |
| 5 AM | | | | | | | |
| 4 AM | | | | | | | |
| 3 AM | | | | | | | |
| 2 AM | | | | | | | |
| 1 AM | | | | | | | |
| 12 PM | | | | | | | |
| TIME | MON | TUES | WED | THUR | FRI | SAT | SUN |

WEB ACCESS RESTRICTED [EDIT]

PUBLIC CHAT ROOMS [EDIT]
NO RESTRICTIONS

PERSONALS [EDIT]
NO RESTRICTIONS

NEWS GROUPS [EDIT]
NO RESTRICTIONS

MESSAGE BOARDS [EDIT]
NO RESTRICTIONS

INSTANT MESSENGER [EDIT]
NO RESTRICTIONS

FILE SHARING [EDIT]
NO RESTRICTIONS

EMAILS [EDIT]
NO RESTRICTIONS 2210  2230  2220

///RESTRICTED    ▓▓ALLOWED

2200                    [DONE]

FIG. 22

REMOTE ADMINISTRATION OF COMPUTER ACCESS SETTINGS

CROSS-REFERENCE TO RELATED APPLICATIONS

This application claims priority to U.S. provisional application having Ser. No. 60/503,333, filed Sep. 16, 2003, which is entirely incorporated herein by reference.

This application is related to copending U.S. utility patent applications entitled "Controlling User-Access to Computer Applications," filed on the same day as the present application and accorded Ser. No. 10/741,483, which is entirely incorporated herein by reference; "Client Comparison of Network Content with Server-Based Categorization," filed on the same date as the present application and accorded Ser. No. 10/741,008, which is entirely incorporated herein by reference; "Synchronizing Automatic Updating of Client," filed on the same date as the present application and accorded Ser. No. 10/740,743, which is entirely incorporated herein by reference; "Time-Based Computer Access Controls," filed on the same date as the present application and accorded Ser. No. 10/740,746, which is entirely incorporated herein by reference; "Online User-Access Reports with Authorization Features," filed on the same date as the present application and accorded Ser. No. 10/741,512, which is entirely incorporated herein by reference; and "Pop-Up Capture," filed on the same date as the present application and accorded Ser. No. 10/741,632, which is entirely incorporated herein by reference.

TECHNICAL FIELD

The present disclosure relates generally to personal computers and, more particularly, to computer access controls.

BACKGROUND

With the growth of computers, many households have computers that are utilized by users of various ages. However, the primary user of a computer may want to limit the services or applications performed by a computer for himself or herself or other users. For example, the primary user may desire to limit the displaying of unsolicited communications that are received over the Internet. Also, the primary user may want to limit the computing resources that are available to a child, for example. Currently, software applications exist, which attempt to limit the computing resources or services performed by a computer. Such applications, however, often are not adequate to effectively limit computing resources in a manner that is preferable to the primary user of the computer.

Thus, a heretofore unaddressed need exists in the industry to address the aforementioned deficiencies and inadequacies.

SUMMARY

The present disclosure provides systems and methods for controlling computer access. Briefly described in architecture, some embodiments of such a system provide a control unit for controlling user access to a computer in accordance with a user profile. An administrator of the computer is enabled to remotely access and modify the user profile. The user profile is stored at least in a remote database that is accessible via a server.

Some embodiments, among others, of a method for controlling computer access to Internet content comprise the steps of: creating at least one user profile having settings customized for a respective user of a computer, the settings specifying types of information that the user is authorized to access on the computer; remotely storing the at least one user profile, the database being in a remote location from the computer; accessing information contained in the at least one user profile from a remote location; controlling access to the computer in accordance with the at least one user profile; and remotely accessing and modifying the at least one user profile.

Other features and/or advantages will be or may become apparent to one with skill in the art upon examination of the following drawings and detailed description. It is intended that all such additional features and/or advantages be included within the description.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIGS. 3-4 are screen diagram displays representing one embodiment of an access control manager for an access control unit of FIG. 1.

FIGS. 6-7 are screen diagram displays showing one embodiment of a user interface for creating subordinate configuration profiles for the access control unit of FIG.1.

FIG. 15 is a screen diagram display of one embodiment of a quick set-up interface for choosing access control settings for the access control unit of FIG. 1.

FIG. 17A is a screen diagram display of one embodiment of a user interface for blocking and/or allowing access to Internet web sites for the access control unit of FIG. 1.

FIGS. 17B-17F are screen diagram displays of one embodiment 1700 of a user interface for blocking and/or allowing access to computer applications for access control unit of FIG. 1 by adding a particular software application to an application-category.

FIG. 18 is a screen diagram display of one embodiment of a user interface viewing requests to edit access restrictions for the access control unit of FIG. 1.

FIG. 20 is a screen diagram display of one embodiment of a user interface for viewing a particular user activity history for the access control unit of FIG. 1.

FIG. 22 is a screen diagram display of one embodiment of a user interface for viewing and editing access time restrictions for the access control unit of FIG. 1.

DETAILED DESCRIPTION OF THE PREFERRED EMBODIMENTS

Figure 1:
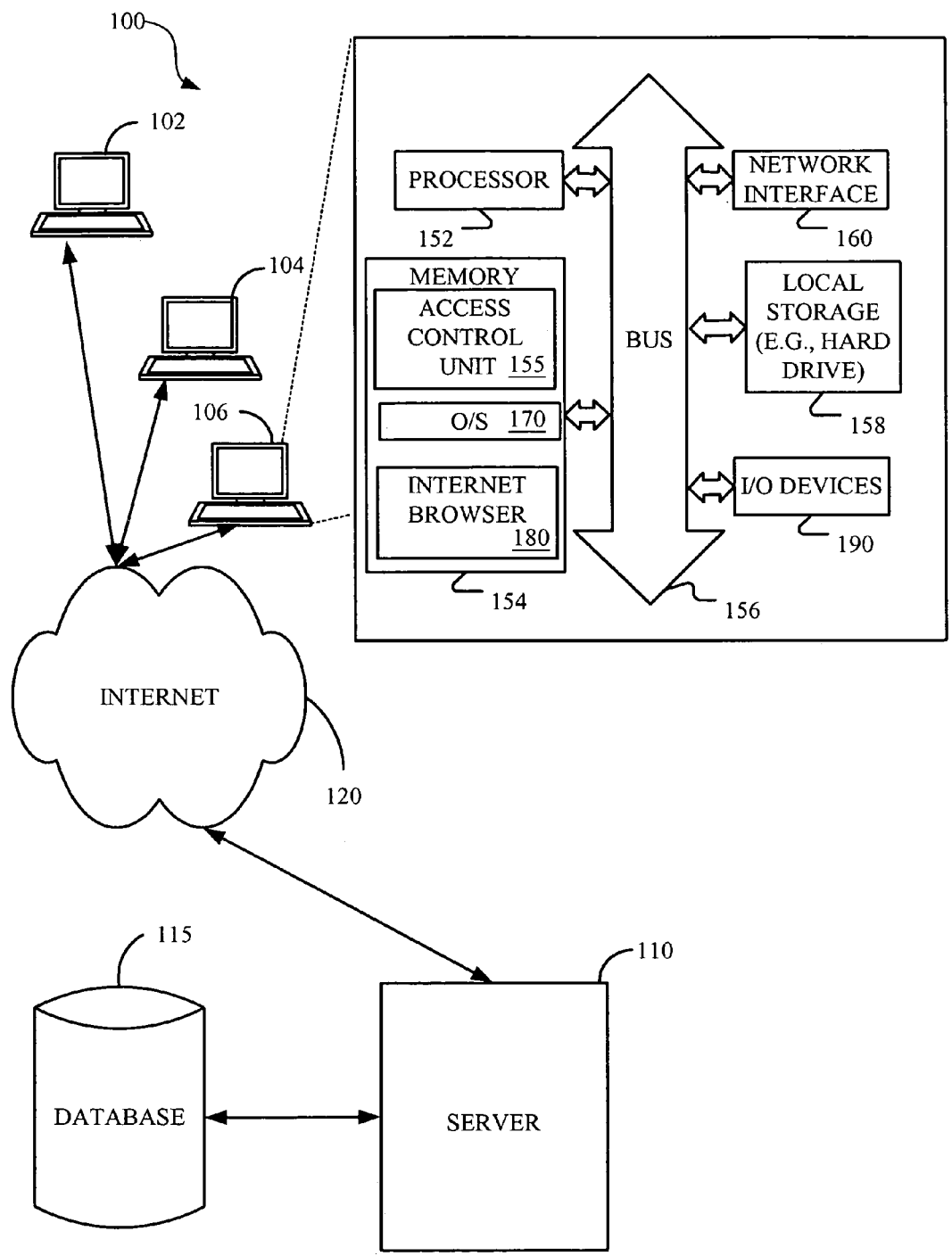
FIG. 1 is a block diagram of a system for controlling access to computer services for embodiments of the present disclosure.

Reference is now made in detail to the description of the embodiments as illustrated in the drawings. While several embodiments are described in connection with these drawings, there is no intent to limit to the embodiment or embodiments disclosed herein. On the contrary, the intent is to cover all alternatives, modifications, and equivalents.

The present disclosure provides systems and methods, in various embodiments, for controlling access to computing services. FIG. 1 is a block diagram of one embodiment of the system 100 for controlling user-access to computing services. As shown in FIG. 1, the access control system 100 comprises general-purpose computers 102, 104, 106 that are coupled to a server 110 over a network such as the Internet 120. Typically, the communication network 120 provides access to Internet services such as email, file transfer protocols (FTP), World Wide Web (WWW), Internet Relay Chat (IRC), etc. and newsgroups, such as Usenet, among others. The server 110 is coupled to a database 115 that stores user configuration profiles of various users.

In the operating environment shown in FIG. 1, a user of a general-purpose computer 106 attempts to access stored applications on the computer 106 and network services from the network 120. As shown in FIG. 1, the general-purpose computer 106 includes a processor 152, a network interface 160, memory 154, a local storage device 158, and a bus 156 that permits communication between the various components. While not explicitly shown, it should be appreciated that the other computers 102, 104 may also include similar components that facilitate computation or execution of applications on the computers 102, 104. In some embodiments, among others, the local storage device 158 is a hard drive configured to electronically store data. The local storage device 158 may also store computer programs that execute on the computer 106. In this sense, the processor 152 is configured to access any program that is stored on the local storage device 158, and execute the program with the assistance of the memory 154.

The network interface 160 is configured to provide an interface between the general-purpose computer 106 and the network 120. Thus, the network interface 160 provides the interface for the computer 106 to receive any data that may be entering from the network 120 and, also, to transmit any data from the computer 106 to the network 120. Specifically, in some embodiments, the network interface 160 is configured to permit communication between each of the computers 102, 104, 106 and the server 110 and, additionally, to permit communication between the computers 102, 104, 106 themselves. In this regard, the network interface 160 may be a modem, a network card, or any other interface that communicatively couples each of the computers 102, 104, 106 to the network. Since various network interfaces are known in the art, further discussion of these components is omitted here.

In the embodiment of FIG. 1, an access control unit 155 is shown as being loaded into memory 154 for launching at the general-purpose computer 106, thereby permitting a primary user or administrator of the general-purpose computer 106 to control which applications may be accessed by other users of the computer 106. Further, the administrator (e.g, primary user) may control which communications and/or network services from the network 140 are accessible or displayed to users of the general-purpose computer.

I. Architecture

The access control unit 155 of one embodiment can be implemented in software, firmware, hardware, or a combination thereof. Preferably, the access control unit 155 is implemented in software, as an executable program, and is executed by a special or general-purpose digital computer 106, such as a personal computer, workstation, minicomputer, or mainframe computer. In various embodiments, the access control unit 155, as software, is downloaded from the Internet by the general-purpose computer 106 and subsequently installed on the general-purpose computer 106. In some other embodiments, the access control unit 155, is provided via computer disks, computer cards, or other file-storage devices, or is pre-installed on the general-purpose computer 106.

The memory 154 can include any one or combination of volatile memory elements (e.g., random access memory (RAM, such as DRAM, SRAM, etc.)) and nonvolatile memory elements (e.g., ROM, hard drive, tape, CDROM, etc.). Moreover, the memory 154 may incorporate electronic, magnetic, optical, and/or other types of storage media. Note that the memory 154 can have a distributed architecture, where various components are situated remote from one another, but can be accessed by the processor 152.

The software in memory 154 may include one or more separate programs, each of which comprises an ordered listing of executable instructions for implementing logical functions. In the example of FIG. 1, the software in the memory 154 includes the access control unit 155, an Internet browser application 180, and an operating system (O/S) 170. The operating system 156 essentially controls the execution of other computer programs, and provides scheduling, input-output control, file and data management, memory management, and communication control and related services.

The access control unit 155 may be a source program, executable program (object code), script, or any other entity comprising a set of instructions to be performed. If the access control unit 155 is a source program, then the program needs to be translated via a compiler, assembler, interpreter, or the like, which may or may not be included within the memory 154, so as to operate properly in connection with the O/S 170. Furthermore, the access control unit 155 can be written as (a) an object oriented programming language, which has classes of data and methods, or (b) a procedure programming language, which has routines, subroutines, and/or functions, for example but not limited to, C, C++, Pascal, Basic, Fortran, Cobol, Perl, Java, and Ada.

The I/O devices 190 may include input devices, for example but not limited to, a keyboard, mouse, scanner, digital camera, multi-function device, digital sender, microphone, etc. Furthermore, the I/O devices 190 may also include output devices, for example but not limited to, a printer, display, etc. Finally, the I/O devices 190 may further include devices that communicate both inputs and outputs, for instance but not limited to, a modulator/demodulator (modem; for accessing another device, system, or network), a radio frequency (RF) or other transceiver, a telephonic interface, a bridge, a router, etc.

The software in the memory 154 may further include a basic input output system (BIOS) (omitted for simplicity). The BIOS is a set of essential software routines that initialize and test hardware at startup, start the O/S 170, and support the transfer of data among the hardware devices. The BIOS is stored in ROM so that the BIOS can be executed when the computer 106 is activated.

When the computer 106 is in operation, the processor 152 is configured to execute software stored within the memory 154, to communicate data to and from the memory 154, and to generally control operations of the computer 106 pursuant to the software. The access control unit 155, Internet browser 180, and the O/S 170, in whole or in part, but typically the latter, are read by the processor 152, perhaps buffered within the processor 152, and then executed.

When the access control unit 155 is implemented in software, as is shown in FIG. 1, it should be noted that the access control unit 155 can be stored on any computer readable medium for use by or in connection with any computer related system or method. In the context of this document, a computer readable medium is an electronic, magnetic, optical, or other physical device or means that can contain or store a computer program for use by or in connection with a computer related system or method. The access control unit 155 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In an alternative embodiment, where the access control unit 155 is implemented in hardware, the access control unit 155 can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

II. Operation

Figure 2:
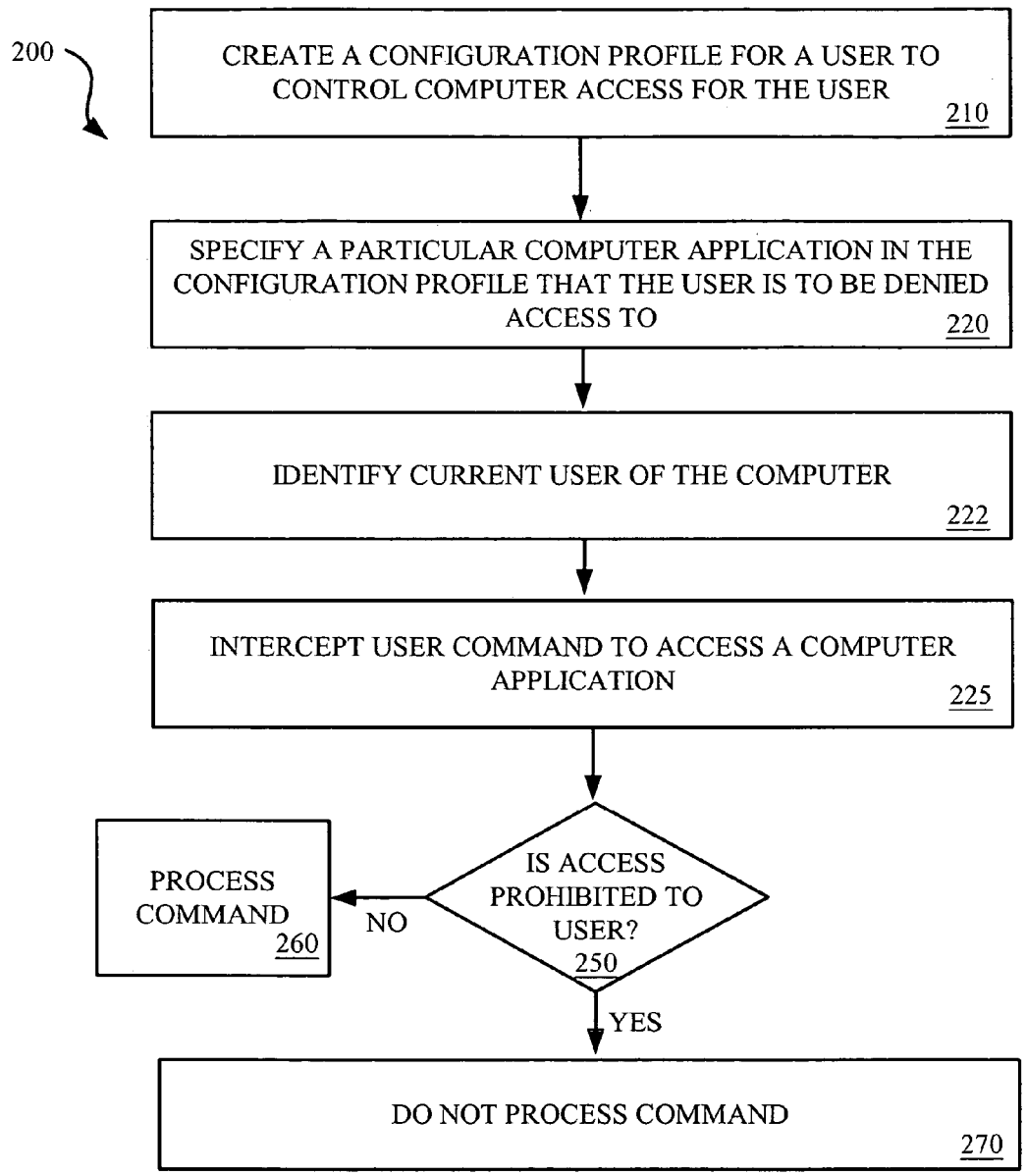
FIG. 2 is a flowchart describing one embodiment of a process for controlling access to computer applications for the system of FIG. 1.

The flowchart of FIG. 2 shows the functionality of a representative implementation of the system 100 for controlling user-access to computing services, in accordance with one embodiment. It should also be noted that in some alternative implementations the functions noted in the various blocks may occur out of the order depicted in the flowchart of FIG. 2 (and subsequent flowcharts presented herein). For example, two blocks shown in succession in FIG. 2 may, in fact, be executed substantially concurrently. Alternatively, the blocks may sometimes be executed in the reverse order depending upon the functionality involved.

As depicted in FIG. 2, the functionality of a representative embodiment of the system for controlling user-access to computing services 100 or method 200 may be construed as beginning at block 210. First, an administrator (e.g., a primary user, such as a parent) of a general-purpose computer 106 specifies that user-access to a particular computer application or program (stored locally on the computer 106) is to be controlled and regulated by the access control unit 155. In some embodiments, the administrator specifies that access to a particular computer application is to be regulated by listing the particular application in a configuration profile of a particular user of the computer. For computers with multiple users (besides the administrator), multiple configuration profiles may be provided for the multiple users. Typically, the processes of the access control unit 155 are executed upon start-up of the general-purpose computer 106 (although the access control unit may also be activated or de-activated upon a manual command from the administrator).

The administrator creates (210) a configuration profile for each user (of the general-purpose computer 106) whose computer access is going to be regulated by the administrator via the access control unit 155. For each user, the configuration file contains a respective username and password that is used to verify the identity of a current user of the computer 106. For example, if a parent acts as an administrator of the general-purpose computer 106, the parent can create a configuration profile for each child of the parent that utilizes the computer 106. In this way, the parent registers each child as a registered user of the computer 106. Typically, in some embodiments, among others, the parent, as administrator, establishes a master configuration profile for himself or herself and then establishes subordinate configuration profiles ("sub-profiles") for others users (e.g., his or her children) of the computer 106. Within the respective subordinate configuration profile of the other users of the computer 106, the parent, as administrator, may restrict user-access to particular computer applications and services for a respective user. Alternatively, the administrator may assign one username and one password to a group of users who will share the same access restrictions. Similarly, more than one person may serve as an administrator by sharing a username and password.

When the administrator sets up the access control unit 155 on the general-purpose computer 106, the administrator typically establishes a connection with the network 120 and accesses the server 110 by using the World Wide Web (WWW), although other embodiments could access the server 110 via other manners of communication. For example, in some embodiments, a web server (not shown) is in communication with the server 110, and the web server provides web pages to the administrator that the administrator utilizes to receive and send information to the web server. The web server then forwards the information to and from the server 110. In other embodiments, the functionality of the server 110 may include that of a web server.

The administrator defines a (subordinate) configuration profile for each user (besides the administrator) of the general-purpose computer and stores the configuration profile(s) in the database 115. A copy or version of the configuration profile for each user is also stored on the general-purpose computer 106. However, the version of a user's configuration profile stored on the general-purpose computer 106 may not be identical to the user's configuration profile in the database if the configuration profile in the database has been modified and the modified version has not yet been stored on the general-purpose computer 106. For example another computer (other than general-purpose computer 106) can be utilized to modify the user's configuration profile in the database 106. The process of updating versions of configuration profiles stored in the database and general-purpose computer is discussed below.

The administrator (e.g., parent) may access the configuration profile of a user (e.g., a child) by facilitating communication between a general-purpose computer (with an Internet browser 180) and the server 110. In this way, the administrator may monitor and configure the access control unit 155 remotely from other computers besides the general-purpose computer 106 where the access control unit 155 resides. Upon certain computer events, the configuration profiles on the general-purpose computer 106 and the database 110 are "synchronized" or updated so that the versions of the configuration profiles stored in the general-purpose computer 106 are identical to versions of the configuration profile stored in the database 115 at the time of synchronization. For example, in some embodiments, at start-up of the general-purpose computer 106, the access control unit 155 attempts to retrieve the latest configuration profiles from the database 115 for each user of the general-purpose computer 106. Other computer events (besides computer start-up) that also may initiate the synchronization procedure involve a user logging into the access control unit 155, a user logging off the access control unit 155, and the launching of the Internet browser application 180, among others. Note, in alternative embodiments, an administrator may modify a local configuration profile stored in the general-purpose computer 106. The access control unit 155 then stores the modifications of the user's configuration profile in the general purpose computer 106 transfers and updates the user's configuration profile in the database 106 when the general-purpose computer 106 is connected to the network 120.

Referring back to FIG. 2, within the configuration profile (sub-profile) of a respective user whose user-access is to be restricted, the administrator specifies (220) a particular computer application that the respective user is to be denied access to (as generally discussed with regard to FIGS. 17B-17F). Typically, the configuration profile is then saved with the provided information. Subsequently when a user attempts to access the general-purpose computer 106, the access control unit 155 identifies (222) the current user of a computer 106. To determine the identity of the current user, the access control unit 155 prompts the current user to enter a valid password and username that is contained within one of the configuration profiles created by the administrator. Upon receiving a username and password from the current user, the access control unit 155 verifies whether the current user is a registered user by trying to match the username and password provided by the current user with a username and password contained in the server database 115 by performing a database lookup of the current user's username and password. If no response is received from the server 110, the access control unit 155 looks in the local configuration profiles. If the username and password of a configuration profile matches the username and password provided by the current user, the access control unit 155 checks (250) the configuration profile of the current user to determine whether the current user is allowed to access the particular computer application.

If the current user is authorized to access the particular computer application, the access control unit 155 processes (260) the command to launch the particular computer application. If the current user is not authorized to access the particular computer application, the command to launch the computer application is not processed (270) by the access control unit, and the current user is denied access to the particular computer application. Note, the administrator may prevent access to multiple computer programs and applications for each registered user and may impose different access restrictions for different users. Also, a current user that provides a username and password that does not match a username and password contained in a configuration profile is prohibited from accessing the requested computer application.

Figure 3:
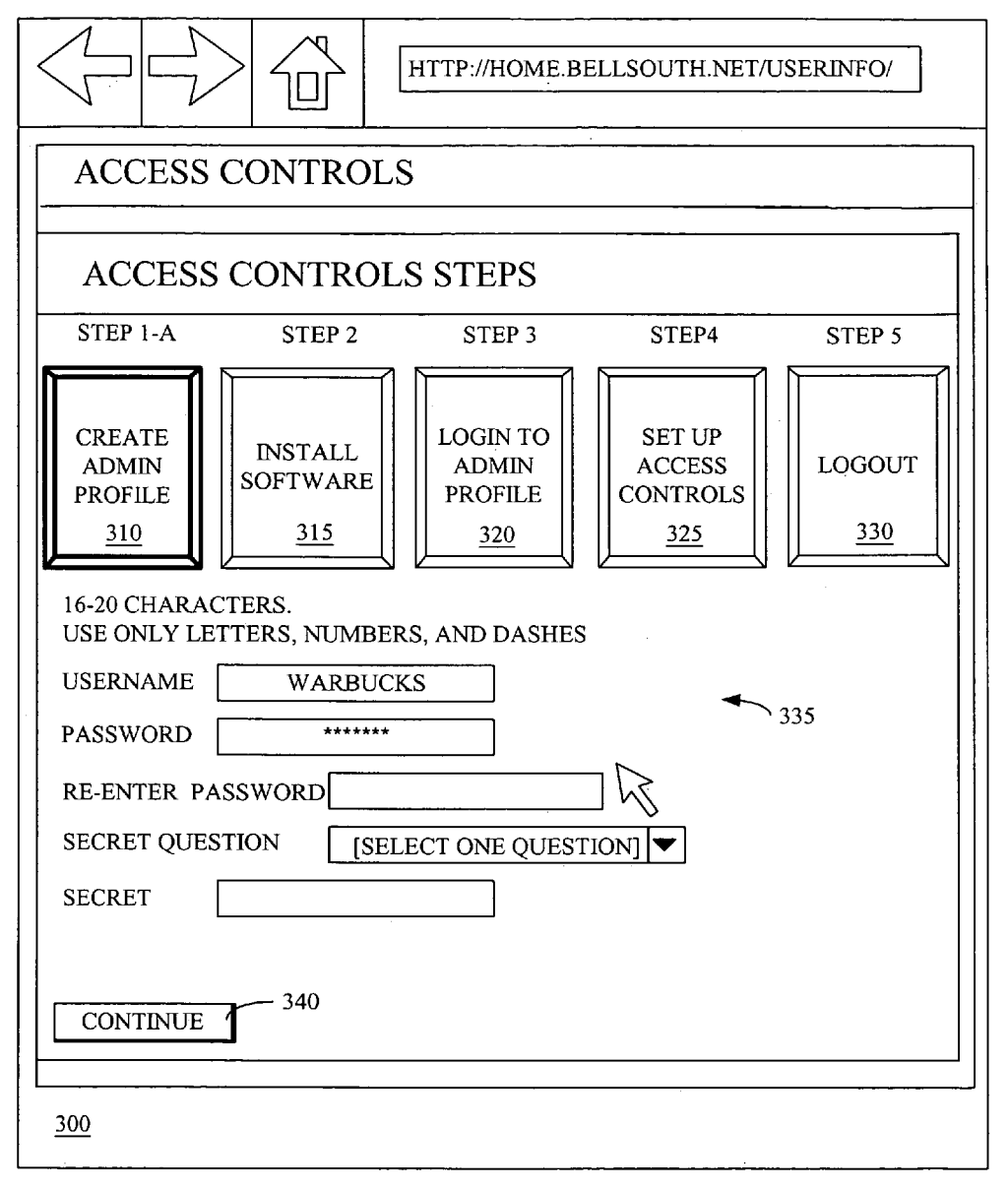

For illustrative purposes, FIGS. 3-4 are screen diagram displays representing one embodiment of an access control manager 300 for the access control unit 155 of FIG. 1. As shown in FIG. 3, the access control manager 300 for the access control unit 155 comprises a create admin profile selection button 310 (i.e., logic for displaying a button representation that affects associated functionality when selected by a user with an input device), an install software selection button 315, a login to admin profile selection button 320, a set-up access controls selection button 325, and a logout selection button 330. To illustrate, if a primary user or administrator selects the create admin profile selection button 310 (as shown), then the administrator is prompted to provide user-information 335 that is used to create an administrator profile for the primary user. The requested user-information includes a username, a password, ands a secret question and answer. The secret question and answer are used to verify the administrator in case the administrator forgets his or her username and/or password.

Then, to provide additional information, the administrator selects the continue selection button 340 and is prompted by the access control manager 300 to provide additional user information 345, such as the user's first and last name, email address, zip code, birthday, gender, etc., as shown in FIG. 4, that may be utilized for identification purposes and to provide customized functionality for the user. After the administrator has completed entering in all of the requested information, the administrator selects the done selection button 350, and then, the user's information is transferred to the server 115 for storage. At this time or a subsequent time thereafter, the administrator installs any software that is used to operate the access control unit 155 and has not been previously installed on the general-purpose computer 106 whose access is being regulated. For example, in some embodiments, the administrator selects the install software selection button 315 on the access control manager 300 to download software components for the access control unit 155 from the Internet 120. In other embodiments, software components may also be provided on computer disks, computer cards, or other file-storage devices. Executing installed components of the access control unit 155 may be facilitated by activating (e.g., "clicking on") an applicable icon in a system tray interface and/or a "start menu" which are typically provided in windows operating environment of many general-purpose computers.

Figure 5:
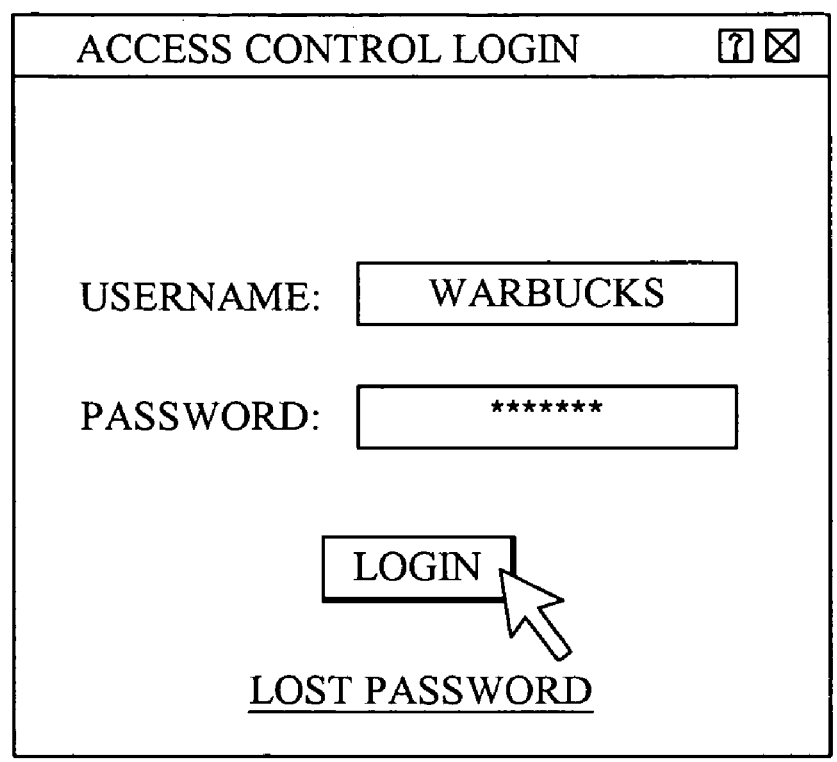
FIG. 5 is a graphical user interface of a login box for the access control unit of FIG. 1.

After the administrator has created his or her administrator profile and has installed the relevant software and/or hardware components of the access control unit 155, the administrator will be prompted to log into his or her administrator ("admin") profile. If a user selects the login to admin profile selection button, a login box is launched, as shown in FIG. 5. From the login box 500, the user is prompted to enter his or her username and password in order to identify the current user and to verify that the current user of the general-purpose computer 106 is a registered administrator. If the user is not verified to be the administrator of the computer 106 (after a lookup request to profile information in the database 115 or locally stored profile information, for example), then the current user is denied access to setting up or modifying access controls.

Figure 6:
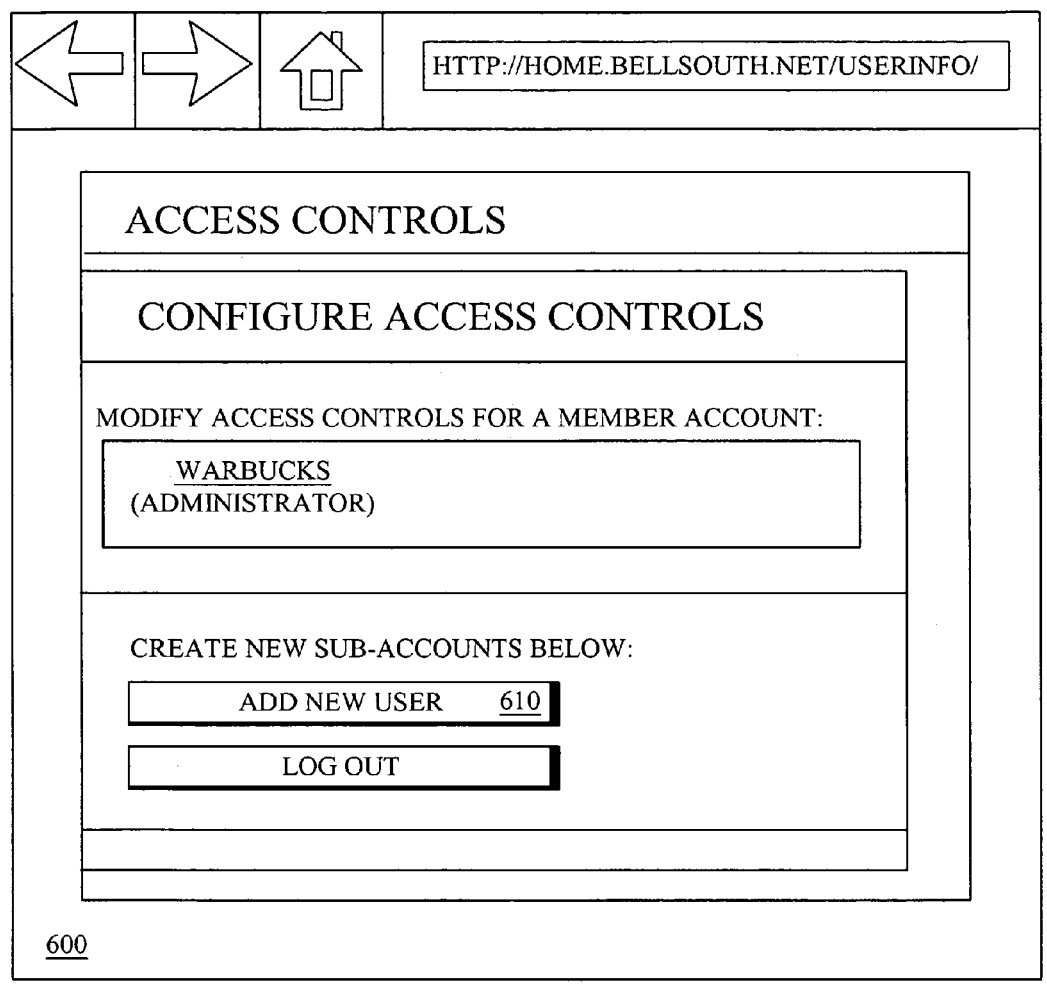

However, if the current user is verified to be an administrator, the user or administrator can select the set-up access controls selection button 325 to create sub-profiles and related settings. FIGS. 6-7 are screen diagram displays showing one embodiment 600 of a user interface (in the form of a web page displayed in a generic Internet browser for this embodiment) for creating subordinate configuration profiles. To create a new sub-profile, the administrator selects the add new user selection button 610 (shown in FIG. 6). Then, the administrator is prompted to provide user-information 620 that is used to create a sub-profile for a user of the general-purpose computer 106. This information includes a username and password for the user(s) associated with the sub-profile, as shown in FIG. 7. Also, the administrator is requested to provide a password reminder question and answer in case the administrator or user of the sub-profile forgets the username and/or password associated with the sub-profile. The username and password associate with the sub-profile of a respective user is the same username and password that the respective user should provide when the access control unit 155 prompts the user to login and identify himself or herself.

In some embodiments, the operating system 170 is a Microsoft® Windows®-based operating system (98, ME, XP, 2000, NT, etc.). Note, a Windows® system is essentially a message driven operating system in the sense that, the majority of actions that take place are responses to messages sent to the main window procedure of an application. One approach, among others, for intercepting messages in this type of environment, among others, involves hook mechanisms (e.g., "Windows® shell hook" program) that can monitor and intercept messages before the Windows® O/S 170 has decided to which application to direct the message. For example, a Windows shell hook program monitors a running application and is notified by the O/S 170 when the application opens a graphical user interface (GUI) window. The access control unit 155 maintains a configurable list of computer applications that are restricted from the current user. In one embodiment, among others, an entry in the list includes three sets of parameters: (a) an executable (EXE) file name, a product name, & a company Name; (b) a window title, a window class, a window style, & a parent window class; and (c) a defined application-category (e.g., Internet browser, instant messenger, email, etc.). The list of computer applications is typically preconfigured with parameters of popular computer applications. However, the administrator can also add specific computer applications from the general-purpose computer. Accordingly, when a current user launches a computer application, the hook program monitors the computer application and determines if the computer application matches one of the computer applications on the list of computer applications. If there is a match, the access control unit stops processing the computer application.

Accordingly, in some embodiments, the access control unit 155 intercepts messages from an application that attempts to open a GUI window display, since most window applications are initiated by opening a GUI window display. Therefore, the launching of a computer application can be terminated by prohibiting the opening of a GUI window display for that computer application. Note, however, other mechanisms may be used to intercept commands to launch applications within the windows operating system and other operating systems and are contemplated by the present disclosure.

Figure 8:
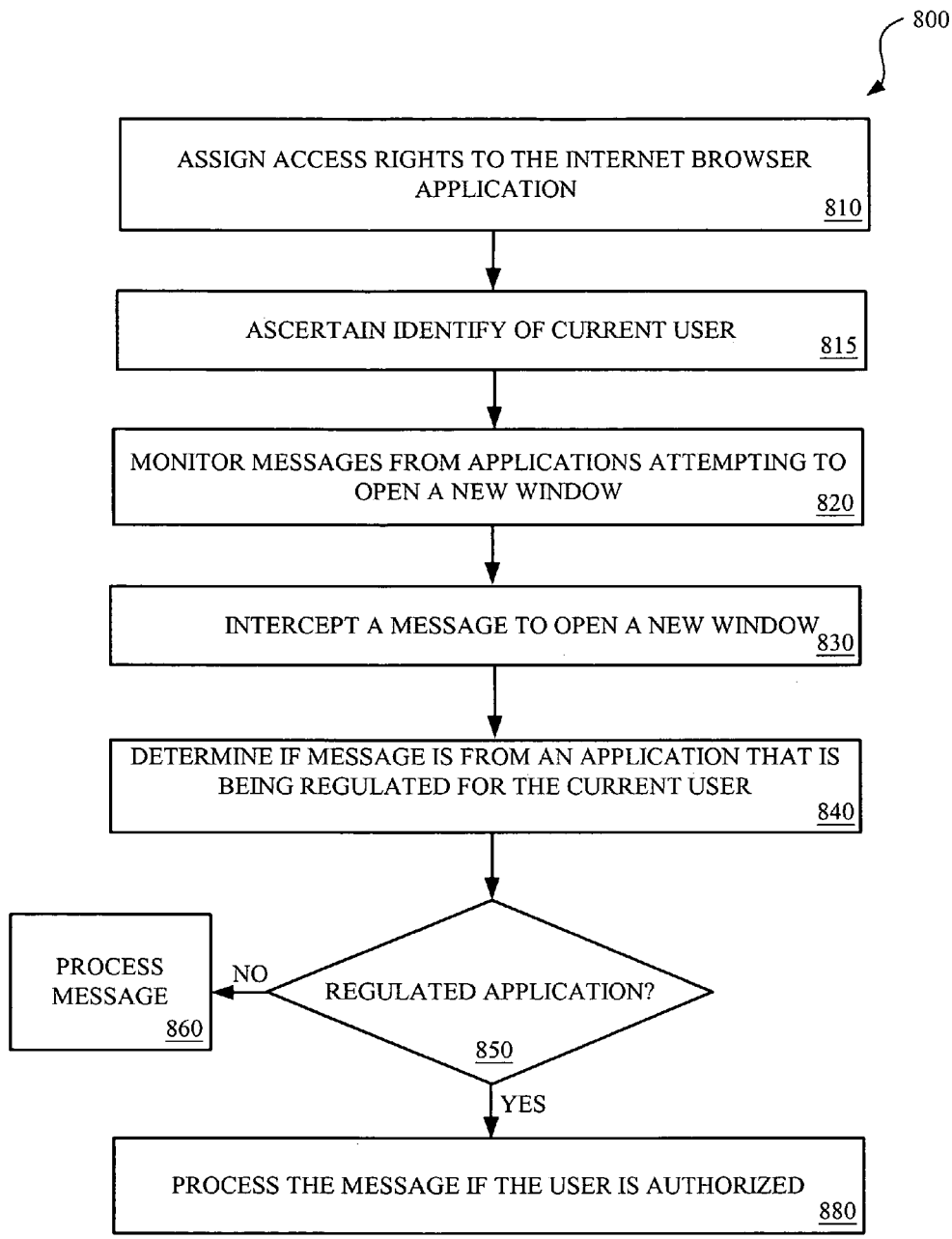
FIG. 8 is a flowchart describing one embodiment of a process for controlling access to a computer application for the system of FIG. 1.

For example, FIG. 8 illustrates one implementation of the method 800 for restricting access to a computer program or application, such as an Internet browser application 180. First, an administrator (e.g., primary user of the general-purpose computer 106) assigns (810) access rights to the Internet browser application 180 for other users of the general-purpose computer 180. Accordingly, the administrator may allow one user to access the Internet browser application 180 and deny access to another user. For example, the administrator may specify in the sub-profile of a particular user that access to a specific Internet browser application is to be prohibited for that particular user. Alternatively, in some embodiments, the administrator may deny access to any application that fits a defined Internet browser category. The Internet browser category may be provided with default Internet browser applications and may further be customized by the administrator to include other Internet browser applications. Accordingly, in other embodiments, the administrator is capable of blocking access to other local applications, such as instant messaging applications, email applications, newsgroup applications, file transfer applications, games, banking applications, etc, as previously described with regard to FIG. 2. Next, the access control unit 155 ascertains (115) the identity of a current user of the computer 106. To ascertain the identity of the current user (who is not already known), the access control unit 155 prompts the current user to identify himself or herself by requesting a username and password of the current user. Note, however, in one embodiment, among others, once the current user has logged in with the access control unit 155, the current user does not have to identify himself or herself again until the current user logs off, or if the computer is restarted (unless there has been 30 minutes of inactivity on the general-purpose computer). After 30 minutes of inactivity, the access control unit 155 prompts a current user to identify himself or herself by providing a username and password.

Then, the access control unit 155 monitors (820) messages from applications on the general-purpose computer 106 that attempt to open a new GUI window display. To illustrate, a current user may use a mouse to "double click" on an Internet browser icon on a windows desktop to attempt to "open" the Internet browser application 180. Then, the Internet browser application 180 generates a request to open a new GUI window to activate an instance of an Internet browser. Accordingly, upon detection of a message or request to open a new GUI window from an application to the O/S 170, the access control unit intercepts (830) the message and determines (840) if the message is from an application whose access is being regulated by the administrator via the access control unit 155 for the current user. In some embodiments, among others, to determine if the administrator has placed user-restrictions on a particular application for the current user, the access control unit 155 determines if the particular application is listed on the local sub-profile that is stored in the general-purpose computer 106 and associated with the username and password that the current user provided. If the particular application is not listed on the local sub-profile of the current user, then the message for opening the new GUI window is processed (860).

Alternatively, if the particular application is listed on the local sub-profile of the current user, the access control unit 155 processes (880) the message for opening the new GUI window if the current user is currently authorized to access the particular application. Therefore, the message for opening the new GUI window is processed and launches the particular application, such as the Internet browser 180. Note, in some embodiments, upon launching the Internet browser 180, the access control unit 155 performs a synchronization operation to update information contained in the sub-profiles of users of the general-purpose computer 106, as described hereinafter.

While the administrator may authorize a current user to activate or launch a particular computer application, some embodiments, among others, of the access control unit 155 also regulate access to certain features or services of particular computer applications for particular users. For example, the administrator may prohibit (via the access control unit 155) an instant messaging application from displaying an instant message (sent from a particular sender) to the current user where the current user is not authorized by the administrator to view instant messages from the particular sender.

Figure 9:
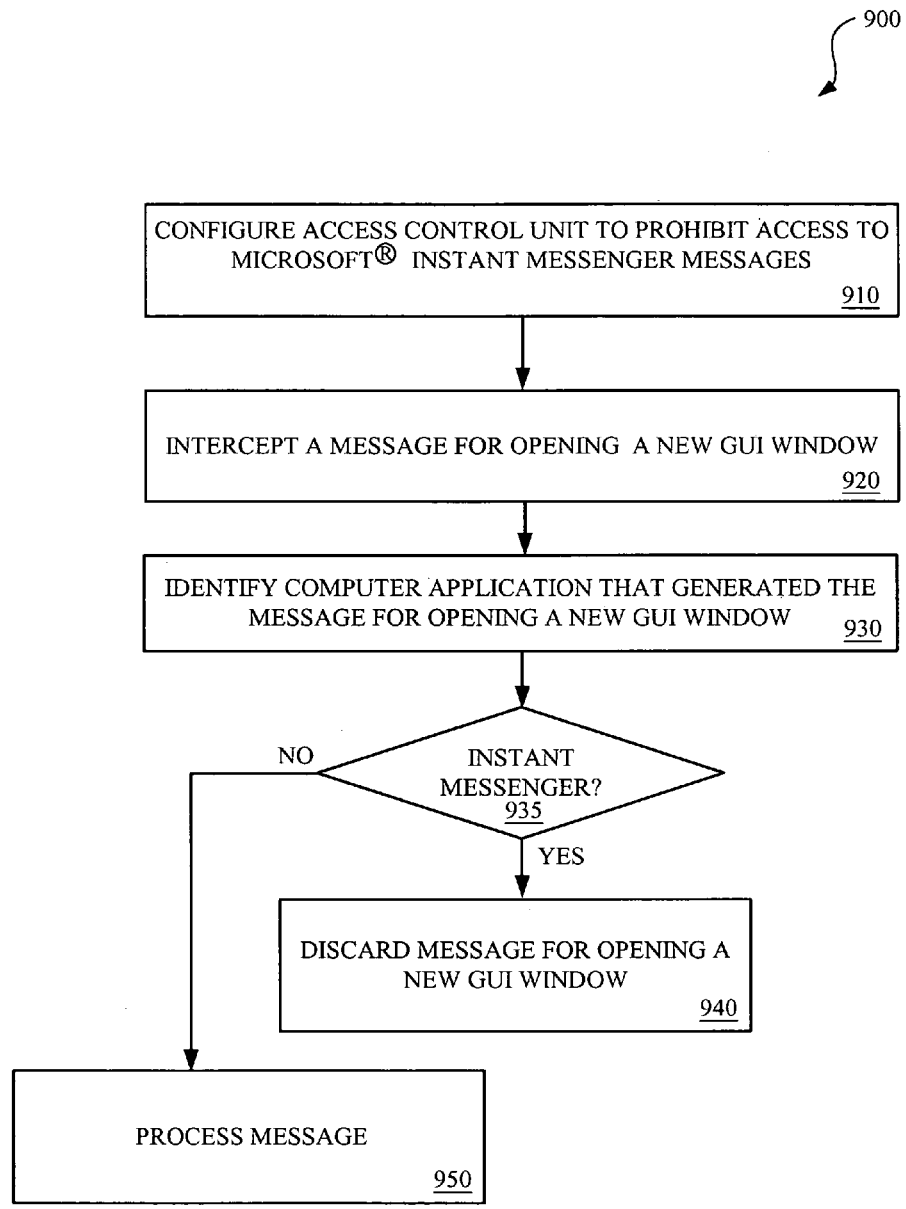
FIG. 9 is a flowchart describing one embodiment of a process for controlling access to a Microsoft® Instant Messenger application for the system of FIG. 1.

In another example, FIG. 9 illustrates one implementation of a method 900 for restricting access to a particular computer application, such as a Microsoft® Instant Messenger. Via Microsoft® Instant Messenger, instant messages are often received on a user's computer 106 that is connected to the Internet 120. Thus, the access control unit 155 may be configured (910) to prohibit access to messages from the Microsoft® Instant Messenger. For this example described in FIG. 9, the access control unit 155, as a default operation, prevents access to the Microsoft® Instant Messenger application for any user of the general-purpose computer. Therefore, for this particular embodiment, the access control unit 155 prevents the Microsoft® Instant Messenger from opening any new GUI windows that may be utilized to display instant messages from the Internet. However, in other embodiments, the administrator may authorize the access control unit 155 to display messages from the Microsoft® Instant Messenger for certain users and not display the messages for others.

Accordingly, when the Microsoft® Instant Messenger sends a message for opening a new GUI window to display a Microsoft® Instant Messenger message on the general-purpose computer 106, the access control unit 155 intercepts (920) the message for opening a new GUI window. The access control unit 155 then determines (930) the identity of the particular computer application that generated the message for opening a new GUI window.

Identification information of the computer application or program that requested the message for opening a new GUI window can typically be obtained from the message request itself. For example, if a first application resides on a general-purpose computer 106, the first application may generate a message request to open a new GUI window. The message request itself identifies that the first application generated the request. Further information about the identity of the first application can be obtained from the computer application itself. For example, identification information may be extracted from the executable file or possibly, from the GUI window properties for the first application. From information contained in the executable file for the first application, the first application may be identified to be an Internet Explorer® program, a Microsoft® Instant Messenger application, Windows® Messenger Service application, a particular version of a program, etc., for example.

In FIG. 9, after the particular computer application is identified, the access control unit 155 does not process (935&940) the windows message for opening a new GUI window if the particular computer application is identified to be the Microsoft® Instant Messenger. Alternatively, the access control unit 155 does process (935&950) the window message if the particular computer application is identified to not be the Microsoft® Instant Messenger (and the particular computer application is not restricted from being accessed by the current user, as previously described in regard to FIG. 8). In other embodiments, access to other computer applications, such as Windows® Messenger Service, may also be restricted using the approach depicted in FIG. 9.

Figure 10:
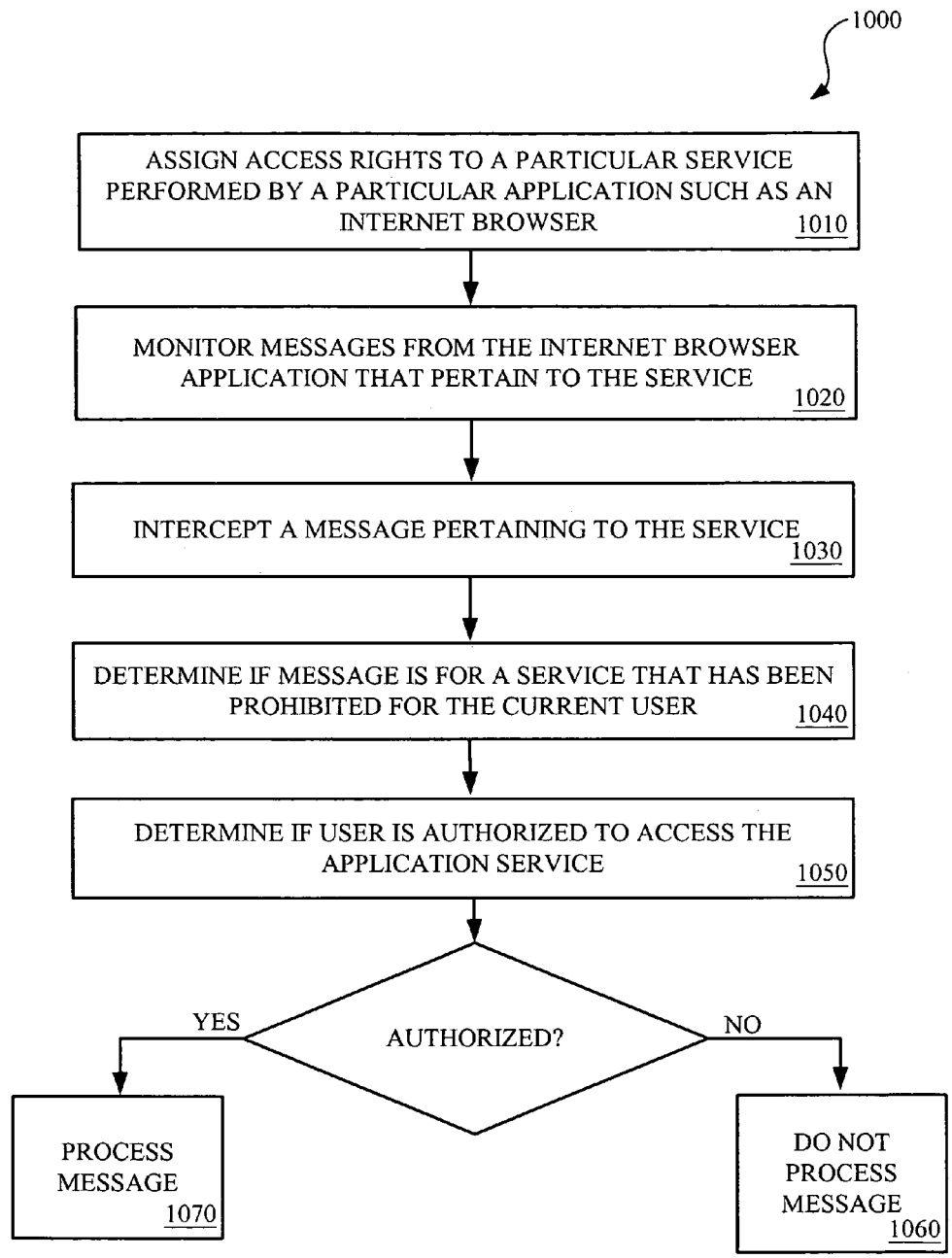
FIG. 10 is a flowchart describing one embodiment of a process for controlling access to a particular service performed by a computer application for the system of FIG. 1.

Next, consider the example of FIG. 10. Here, FIG. 10 illustrates one implementation of a method 1000 for restricting access to a particular service or function performed by a computer application, such as an Internet browser application 180. First, an administrator (e.g., primary user of the general-purpose computer 106) assigns (1010) user-access rights for a particular service performed by a particular computer application, such as an Internet browser application 180. The user-access rights are assigned for other users (other than the administrator) of the general-purpose computer 180. Accordingly, the administrator may allow one user to access some services or features of the Internet browser application 180 that are denied to other users. For example, the administrator may specify in the sub-profile of a particular user that access to a particular web page address (Internet address) from the Internet browser application is to be prohibited for that particular user.

Next, the access control unit 155 monitors (1020) messages from the particular application, such as an Internet browser application 180, that pertain to the particular service whose access is being regulated. For example, if the particular service is a message request for retrieval of a certain web page, the access control unit 155 monitors all requests generated by the Internet browser application 155 for retrieving a web page.

Since most Internet browsers are windows-based, they provide application-specific mechanisms (e.g., hook functions) for monitoring whether the Internet browser is attempting to launch a new GUI window for a web page in a similar manner as the Windows operating system. For example, an Internet Explorer® helper object ("IE Helper COM Object") can install hook components to monitor and control messages and actions of the Internet Explorer® browser. The hook component is notified when a user requests a document identified by a uniform resource identifier (URI). Accordingly, the access control unit 155 maintains a copy of a configurable list of categories and web sites that are to be blocked or controlled. Another version of the list is also stored in the database 115). An entry in the list has two sets of parameters, in one embodiment, among others: (a) a text pattern (such as "chat", "/chat", "mail", "/mail" "www.webmail.com", etc.); and (b) a defined application-category (such as chat, email, etc.). When a current user navigates a web site, the access control unit 155 is notified with the requested URI and compares the URI against the parameters on the list to determine if access to the requested URI should be blocked. For example, if a parameter on the list is contained within the requested URI, access to the requested URI is prohibited by the access control unit 155. Note, for computer programs that do not have application-specific mechanisms for monitoring window requests, mechanisms for monitoring window messages are also provided by the windows O/S 170, as described previously, and can be implemented to perform the operations shown in FIG. 10.

Accordingly, upon detection of a message or request related to the particular service being regulated (e.g., request to retrieve a web page, request to send an instant message, etc.), the access control unit 155 intercepts (1030) the message and determines (1040) if the message is for a service that has been prohibited for the current user of the particular application (who has previously logged into the access control unit 155). The access control unit 155 checks (1050) with the current user's configuration profile that is stored locally on the general-purpose computer 106 to determine if the current user is authorized to access the particular application service, such as access to a particular web page. If the user is authorized to access the particular service, then the access control unit 155 processes (1060) the message relating to the particular service. However, if the user is not authorized to access the particular service, then the access control unit 155 does not process (1070) the message relating to the particular service.

For example, when the current user initiates a request for a web page (at an Internet address) from the Internet browser 180, the access control unit 155 intercepts (1040) the command to retrieve the web page at the specified Internet address (e.g., uniform resource locator (URL)). Then, the access control unit 155 checks the current user's sub-profile to determine if the administrator has prohibited the user from accessing the Internet address.

In some embodiments, the administrator may generally block content-categories of communications from the Internet. For example, the administrator may prevent another user from accessing web pages that have been categorized as "Violence," "Pornography," "Drugs," etc. by the access control unit 155. Therefore, the access control unit 155 determines (1050) whether a particular web site fits a certain content categorization (or rating) and whether a current user has been prohibited from accessing communications of that content categorization (or rating) in order to determine if the current user is authorized to access a particular web site. If, the particular user is prohibited from accessing communications of that particular content categorization, then access control unit 155 blocks (1060) access to the web page by not processing the command from the Internet browser to retrieve the web page. Otherwise, the command to request the web page is processed (1070).

To facilitate the operation of checking (1050) for authorized categories of web pages, the database 115 on the network maintains a list of web sites that are accessible via the Internet and categories or ratings for web sites. This list is continually updated (e.g., on a daily basis). In some embodiments, for example, a ratings service provided by a third party may provide an XML feed to the database 115 for providing current ratings or content-categories of web sites on the Internet 120. Further, content-categories employed by the access control unit 155 may be different from the content-categories provided by the third party rating service. However, the content-categories provided by the third party rating service may be mapped to the content-categories employed by the access control unit 155. Therefore, if a third party service rates a particular web site as "Containing Graphic Violence" that is not employed by the access control unit 155, the content categorization provided by the third party service may be mapped to a content-category that is employed by the access control unit, such as "Violence," for example.

Note, if a requested web site does not fall into a content-category employed by the access control unit 155, the administrator can still block access to the web site by listing the web site in the user's block list ("blacklist") that is contained in the user's configuration profile. Particularly, the administrator may specify particular web sites that are to be prohibited by listing specific domain names on a blacklist for a respective user of the general-purpose computer 106. Correspondingly, the administrator may also specify particular web sites that are allowed to be accessed by a particular user by listing the specific domain name for the particular web site on an allow list ("whitelist") that is contained in the user's configuration profile.

Figure 11:
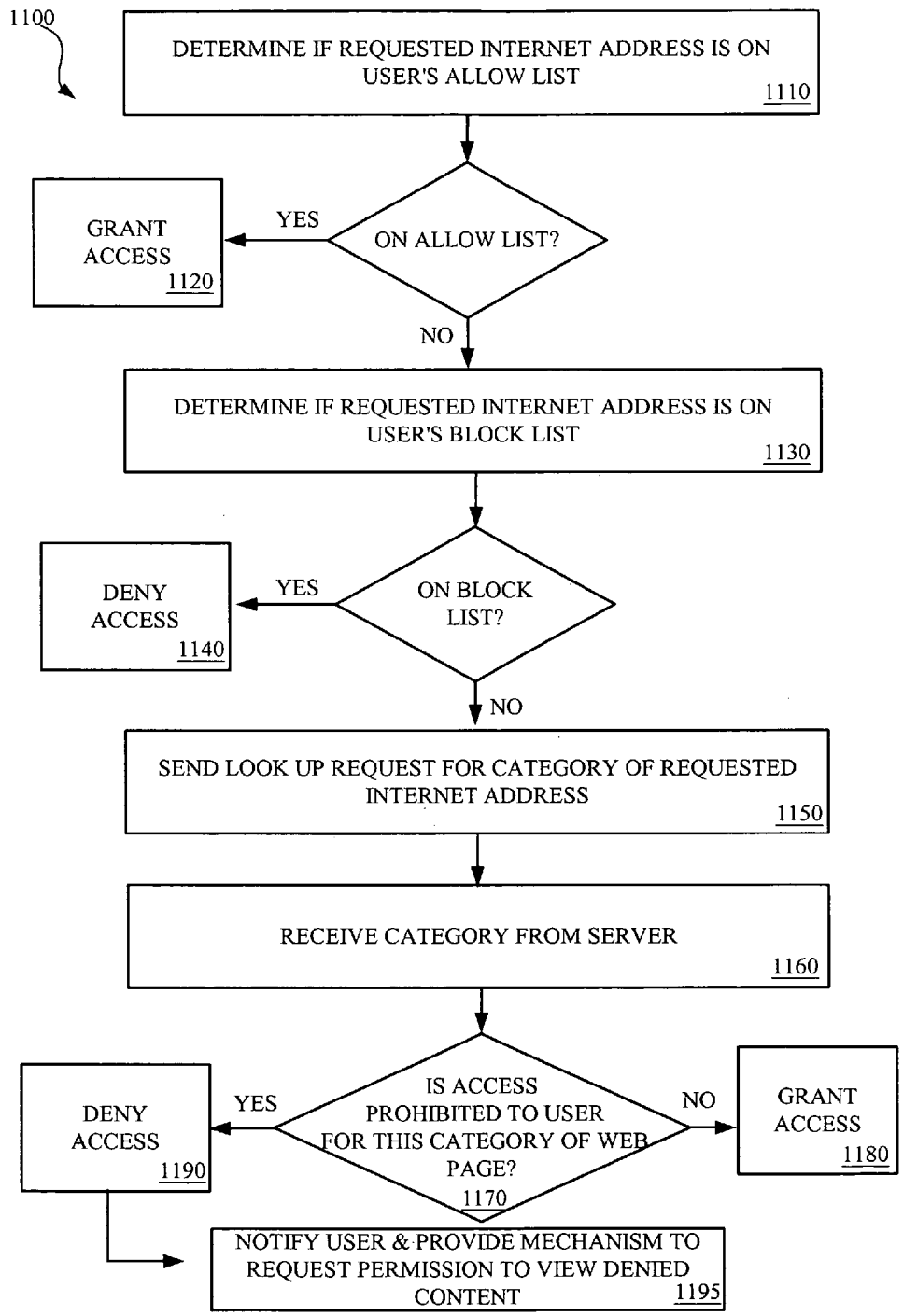
FIG. 11 is a flowchart describing one embodiment of a process for determining if a user is authorized to access a particular Internet address for the system of FIG. 1.

Therefore, FIG. 11 shows a process for determining if a requested Internet address is authorized by the administrator, as implemented in some embodiments. First, the access control unit 155 checks (1110) to see if the requested Internet address (URL) is authorized by the administrator by checking to see if the Internet address is contained in particular user's allow list (in the particular user's configuration profile). Note, an allow list is a list of specific forms of information, such as Internet addresses, computer applications, network services, application services etc., (specified by the administrator) that a respective user is authorized to access.

Therefore, if the requested Internet address, for example, is contained in the allow list, then access to the requested Internet address is granted (1120) by the access control unit 155. If the requested Internet address is not contained in the allow list, the user's block list (in the user's configuration profile) is checked (1130) to see if the requested Internet address is specifically prohibited. Note, a block list is a list of specific forms of information, such as Internet addresses, computer applications, network services, application services, etc. (specified by the administrator) that a respective user is not authorized to access.

Thus, if the requested Internet address is on the current user's block list, then access to the web page located at the Internet address is not granted (1140) by the access control unit for the current user. However, if the requested Internet address is not on the current user's block list, the access control unit 155 sends (1150) a lookup request to the server 110 for a content-category of the requested Internet address. The server 110 responds (1160) by returning the content-category of the requested Internet address. Then, the access control unit 155 checks (1170) to see if the current user is authorized to access communication of that content-category based on the restrictions specified in the current user's configuration profile. If the current user is authorized for the content-category returned from the server 110, the command to retrieve the requested web page is processed (1180) by the access control unit 155.

Figure 12:
FIG. 12 is a diagram of web page for notifying a current user of the denial of access to a requested web site by the access control unit of FIG. 1.

If the current user is not authorized to view a requested web page, the access control unit 155 generates a message request for a special web page from the server 110 to be retrieved (1190), as shown in FIG. 12, for one embodiment of the invention. The information contained in the special web page 1200 informs the current user that he or she is not authorized to view the requested web page. Further, in some embodiments, the web page provides (1195) a mechanism (such as a hyperlink 1210 to a form request page, a hyperlink for generating an email, etc.) for allowing the user to make a request to the primary user for permission to access the prohibited web site. Note, as previously mentioned, most operating systems 170 provide mechanisms for interrupting and manipulating computer application processes, such as hook operations, subclassing, etc. In addition, many computer applications (e.g., Internet Explorer®) also provide mechanisms for interrupting and manipulating computer application processes, such as redirecting the current user to a designated web page.

Figure 13:
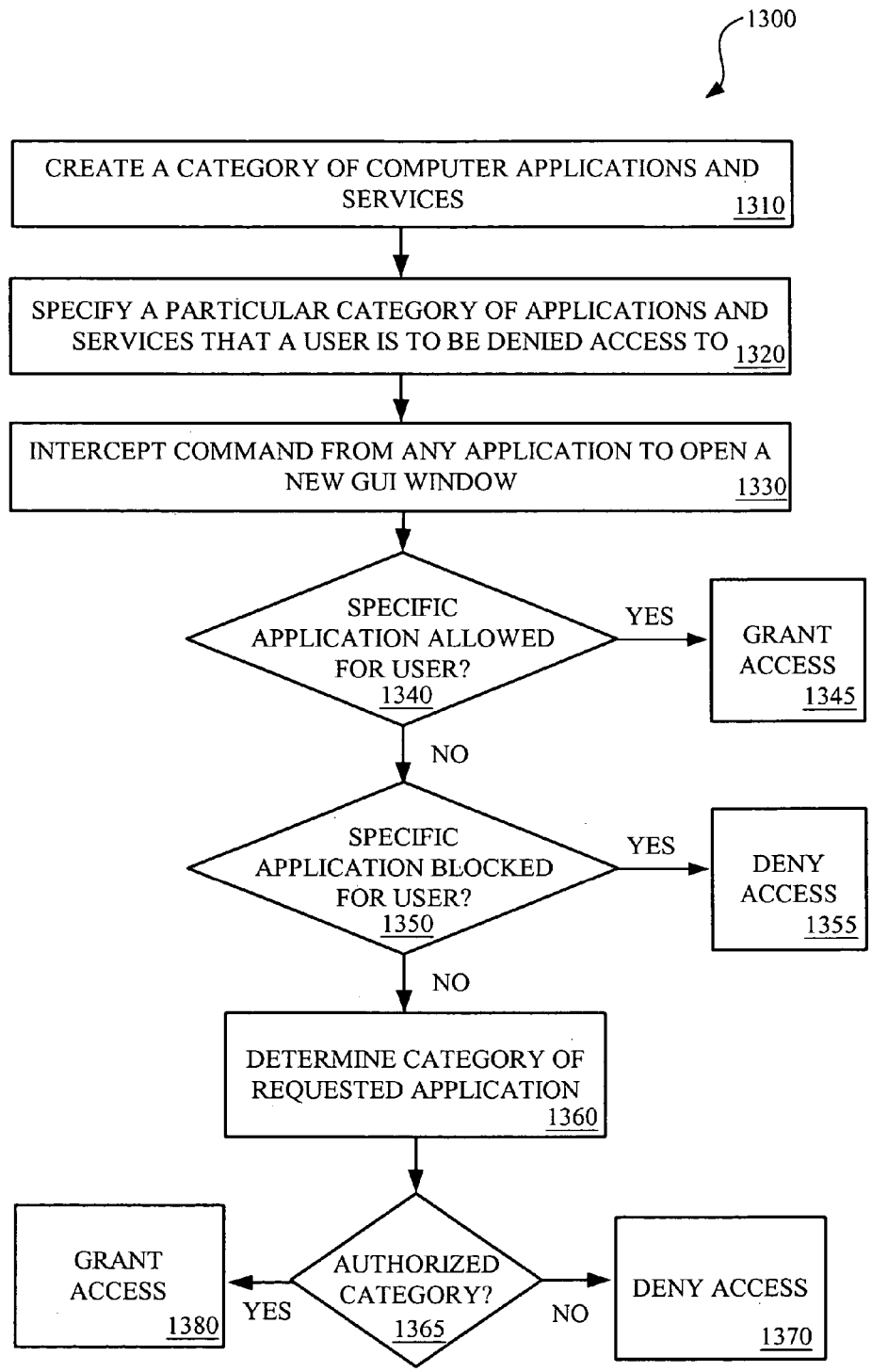
FIG. 13 is a flowchart describing one embodiment of a process for categorizing communication services and applications for the system of FIG. 1.

Next, FIG. 13 illustrates an implementation of a method 1300 for bundling network services and computer applications under single types of access-categories For instance, in some embodiments, in addition to categorizing web pages within certain categorizations/ratings (as described with reference to FIG. 11), local computer applications may also be included (1310) within the same categories ("access-categories"). For example, an "Email" application-category may include web-based email applications and/or services (e.g., mail.yahoo.com, www.hotmail.com, etc.) along with email applications that are stored on the general-purpose computer (e.g, Eudora®, Outlook®, etc.). Further, a "Message Board" application-category may include specific web-based message boards (e.g., groups.yahoo.com, www.e-groups.com, etc.) and message board type applications, such as newsgroup readers (e.g., Free Agent®, Outlook®, etc.).

In this way, the administrator may comprehensively prohibit (1320) a particular user from accessing applications or services of the "Email" application-category, for example, as defined within the configuration profile of the user. Typically, the access control unit 155 provides predefined web sites and computer applications within each predefined application-category. However, the administrator can also specify additional applications and web sites. The access control unit 155 maintains a list of applications and web sites that fit into each application-category. To update this list, a user may instruct the access control unit 155 (by "clicking" on an update button on a toolbar for the access control unit, for example) to check for updates from the server 110 and download a new list from the server 110 if available. Further, the administrator may customize the list by adding a particular computer application to the list and assigning the particular computer application to an application-category.

Therefore, the access control unit 155 intercepts (1330) a message request from a computer application for opening a new GUI window. First, the access control unit 155 determines (1340) whether the message request is from an application (either software-based or web-based) whose access is authorized by the administrator via the access control unit 155 for a current user of the computer 106. For example, a request to open a web site for chat rooms may be authorized in the allow list of a current user. If the application is on the current user's allow list, the access control unit 155 processes the request and grants (1345) access to the application.

Alternatively, the access control unit 155 determines (1350) whether the message request is from an application (either software-based or web-based) whose access is being specifically prohibited by the administrator via the access control unit 155 for a current user of the computer 106. If the application/service is being specifically prohibited by the administrator (by listing the application on a "User Defined Software List," for example, as is discussed hereinafter) or by listing a web site on a block list (e.g., mail.yahoo.com), the request to open a new GUI window is not processed (1355) by the access control unit 155, and the user is denied access.

If the application is not specifically prohibited by the administrator, the access control unit 155 determines (1360) the type of application-category that the application has been designated at by locally retrieving this categorization. If the application belongs to an application-category that has been prohibited by the administrator, then access is denied (1365&1370) and the command to open the new GUI window is not processed by the access control unit 155.

When the current user has been prohibited from accessing a particular computer application, a display GUI window is shown indicating that the current user is not authorized to access the particular application. As previously discussed, the current user may also be prohibited from viewing web pages that are of a certain application-category of application/service that has been disallowed by the administrator. Alternatively, if the current user is authorized to access a particular application or application-category, then the user is granted (1365&1380) access to the application by processing the command to open the new GUI window. Note, to procure additional identification information of a particular applications on the general-purpose computer 106, identification information may be extracted from the executable file for that particular application.

Figure 14:
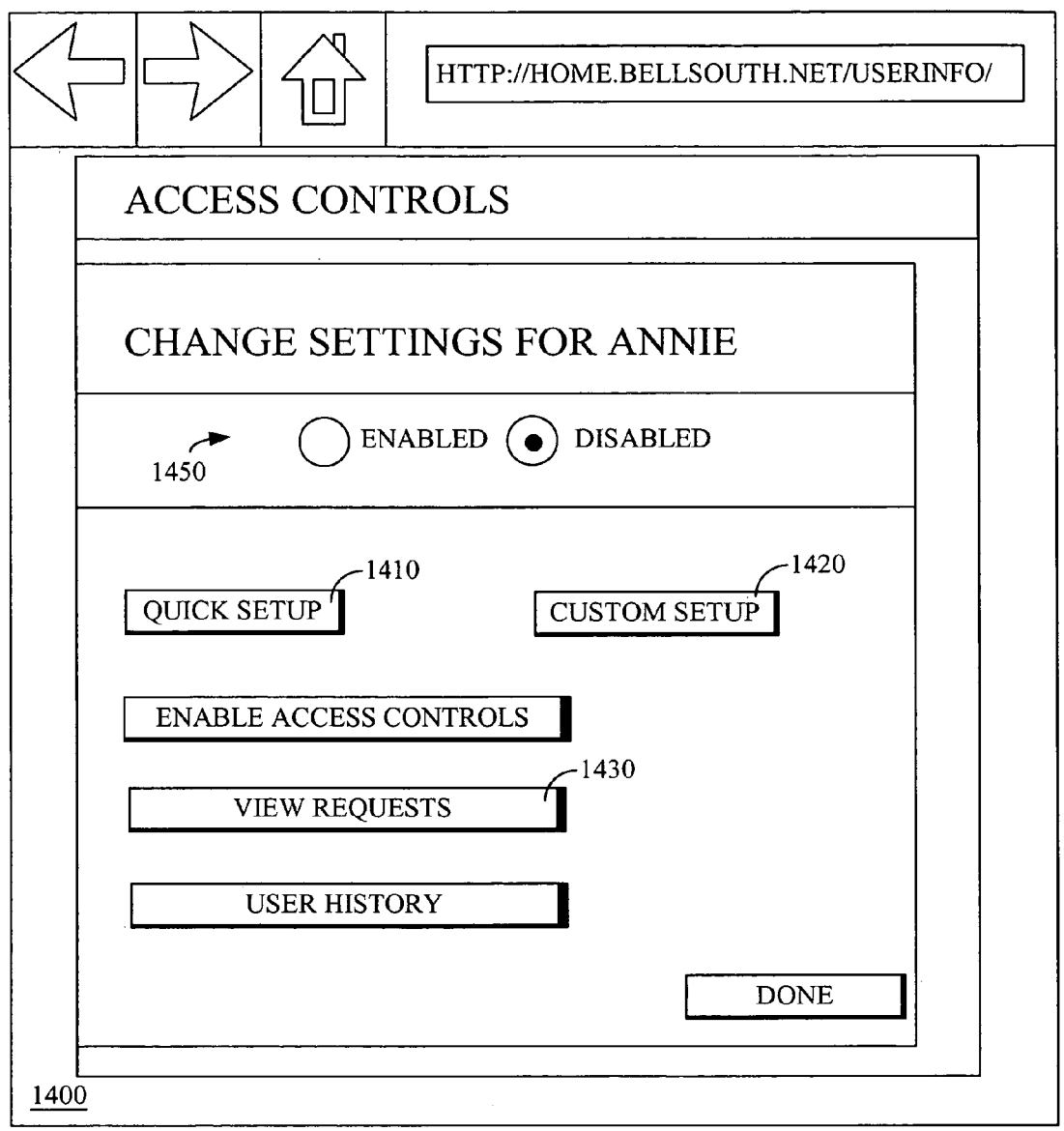
FIG. 14 is a screen diagram display of one embodiment of a user interface for changing and viewing settings and related information associated with the access control unit of FIG. 1.

Next, FIG. 14 is a screen diagram displays showing one embodiment 1400 of a user interface (in the form of a web page displayed in a generic Internet browser for this embodiment) for changing and viewing settings and related information associated with a particular sub-profile. For example, if an administrator chooses the set-up access controls selection button 325 (in FIG. 3), the administrator may be presented with the screen diagram shown in FIG. 14. Then, if the administrator selects the quick set-up selection button 1410, the administrator is presented with default categorizations of Internet service content and computer applications that the administrator may select—the process of which has been generally described in reference to FIG. 13.

Figure 15:
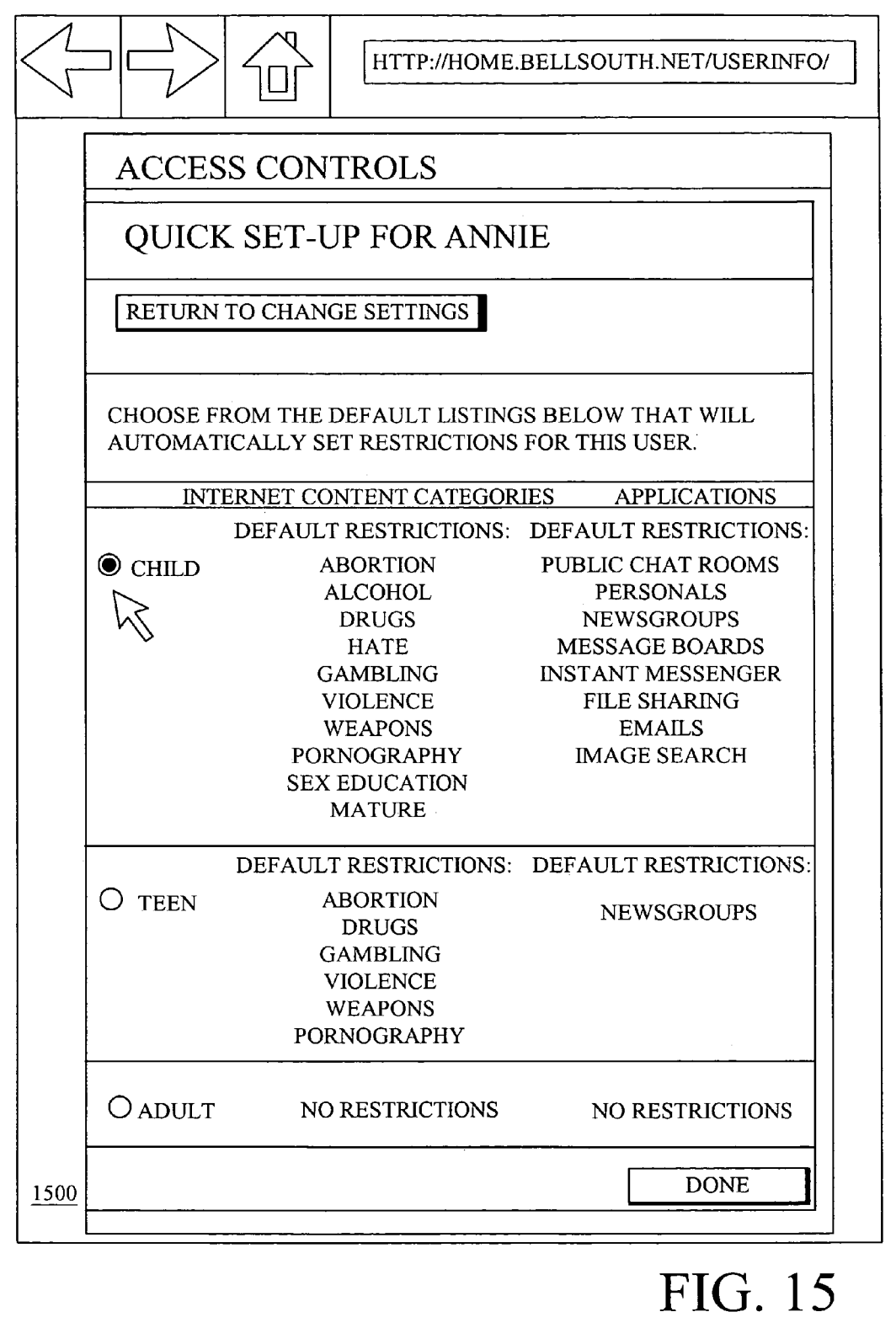

FIG. 15 is a screen diagram of one embodiment 1500 of a quick set-up interface (in the form of a web page displayed in a generic Internet browser for this embodiment) for choosing access control settings. As shown, by classifying a user of a particular sub-profile as a child, a teen, or an adult, default restrictions are implemented corresponding to the selected classification. For example, in FIG. 15, the user of the sub-profile has been classified as a child and therefore, the user of the sub-profile is prohibited from accessing Internet content that falls into one of the listed content-categories (e.g., abortion, alcohol, drugs, hate, etc.) and from accessing applications (either software-based or web-based) that fall into one of the listed access-categories (e.g., public chat rooms, personals, newsgroups, etc.).

Figure 16:
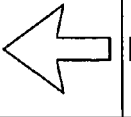
FIG. 16 is a screen diagram display of one embodiment of a custom set-up interface for choosing access control settings for the access control unit of FIG. 1.

Alternatively, an administrator may also select a custom set-up selection button 1420 (in FIG. 14) to manually select and customize the restrictions that are placed in a sub-profile of a user. FIG. 16 is a screen diagram display of one embodiment 1600 of a custom set-up interface (in the form of a web page) for choosing access control settings. As shown, individual categorizations of Internet content and applications (both software-based and web-based) can be selected and prohibited to be accessed by a user of particular sub-profile (e.g., gambling web sites, violence web sites, file sharing applications and file sharing web-sites, etc.), as has been previously discussed. Note, in some other embodiments, application categories may be limited to software-based applications and not include web-based applications.

With regard to FIG. 14, the user interface 1400 of FIG. 14 also provides an enable access controls selection button 1450 to activate/deactivate access restrictions for the user associated with the sub-profile that is being accessed by the administrator. If the administrator deactivates or disables the access restrictions for a sub-profile, then a user of the disabled sub-profile is not subject to the access restrictions listed in the disabled sub-profile.

As previously discussed, an administrator may specify particular web site domain names that are prohibited or specifically authorized to be accessed by a particular user, in addition to specifying types or categories of Internet content. For example, FIG. 17A is a screen diagram display of one embodiment 1700 of a user interface (in the form of a web page for this embodiment) for blocking and/or allowing access to Internet web sites for a user of a sub-profile. As shown, the administrator may enter a URL of a web site and choose the block this site button 1710 to add the web site to a block list or blacklist 1720 of web sites that a user of the associated sub-profile is prevented from accessing. Correspondingly, the administrator may enter a URL of a web site and choose the allow this site button 1730 to add the web site to an allow list or whitelist 1740 of web sites that a user of the associated sub-profile is allowed to access (even if the type of content-category that the web site belongs to has been prohibited).

Figure 17B:
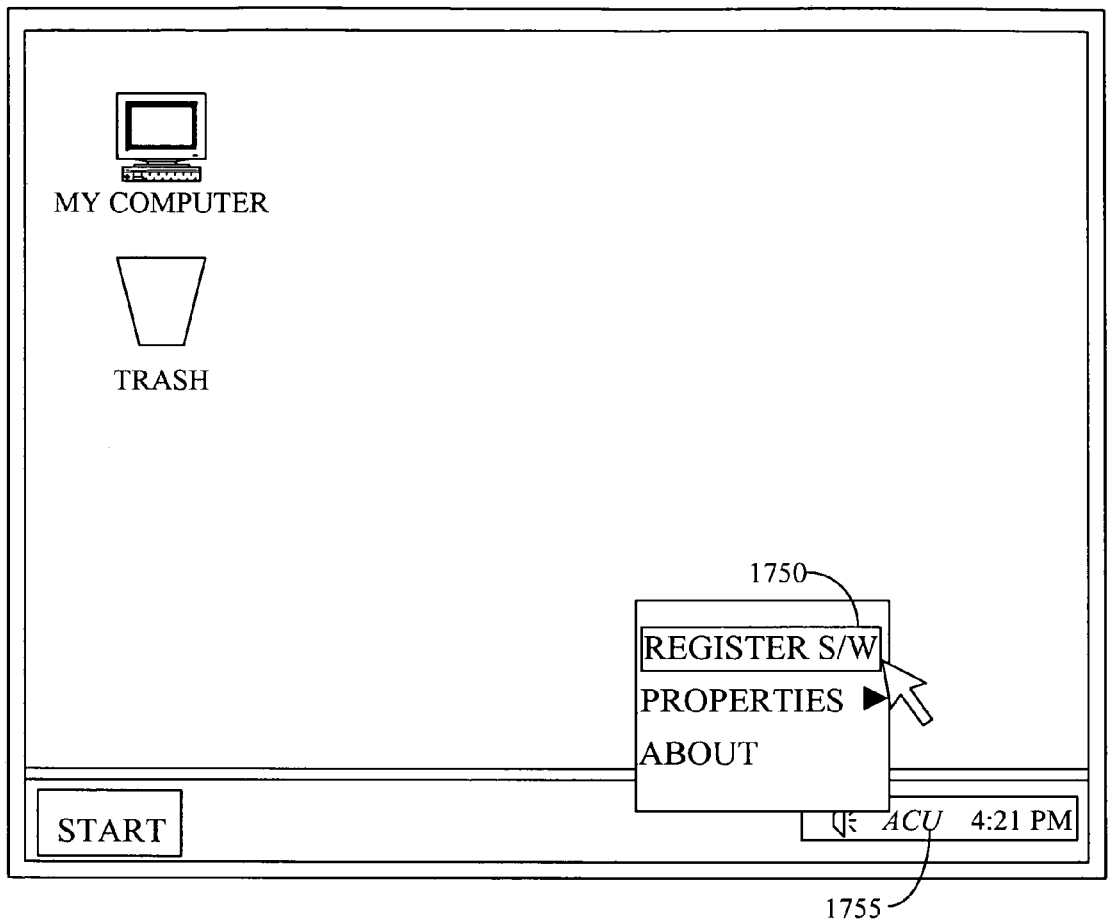
Figure 17C:
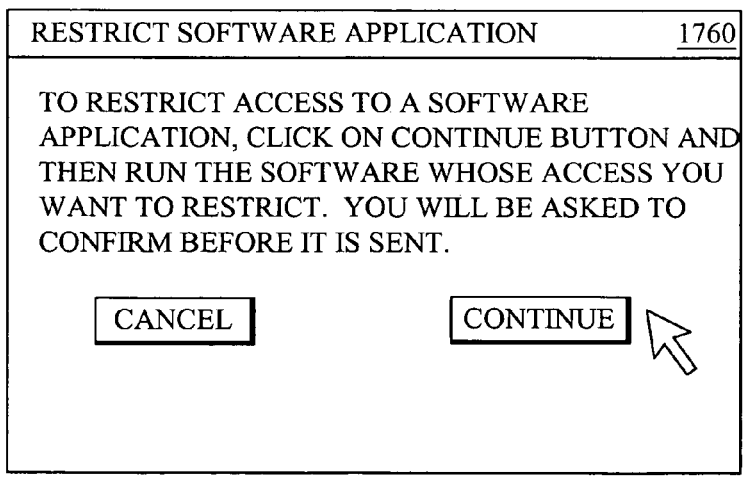

Correspondingly, FIGS. 17B-17F are screen diagram displays of one embodiment of a user interface for blocking and/or allowing access to computer applications for a user of a sub-profile by adding a particular software application to an application-category. As shown in FIG. 17B, the administrator may activate the option of registering a software application by selecting "Register S/W" option 1750 from the access controls unit icon "ACU" 1755 in the system tray of a windows operating environment. Activation of the "Register S/W" 1750 option launches the GUI window 1760 shown in FIG. 17C that instructs the administrator to run or execute the software application whose access the administrator is interested in controlling or restricting. Typically, the administrator can then launch the desired application either by double-clicking (via a mouse command or keyboard command, for example) the application icon for the desired application or selecting the application shortcut from the start menu of the windows operating environment. After the particular application is launched, the access control unit 155 retrieves information from the launched application (such as windows classname, title, executable filename, company name, version, etc.) utilized to later identify the application. Next, the administrator categorizes the particular application in one of the default application-categories provided in a GUI window 1770 shown in FIG. 17D. Note, an "Others" application-category 1775 is provided for a software application that does not fit in one of the other categories provided (such as email client, instant messenger, etc.). The administrator also provides a customized application name to identify the particular application and then selects the submit selection button 1778 to add the particular software application to one of the defined categories of applications whose access is controlled by the administrator (as previously discussed with regard to FIG. 13).

Figures 17D, 17E:

Therefore, if a current user attempts to access the particular software application that has been added to a category of applications that the user is restricted from accessing, the access control unit launches a GUI window display 1780, as shown in FIG. 17E, for one embodiment. The GUI window display 1780 of FIG. 17E informs the current user that the particular application has been listed in an application-category that the current user is restricted from using. To subsequently modify settings associated with an application, the administrator activates a GUI window display 1790 that enables the administrator to access a configuration profile of a user in the database 115 and to select an application of interest and to update or delete the application, as shown in FIG. 17F. For example, the administrator can modify the application-category associated with the respective software application.

In some embodiments, the server 110 provides web pages that may be accessed by the administrator to allow the administrator to monitor and control user-access to the general-computer 106. (In other embodiments, a separate web server may provide the web pages). For instance, the administrator may view the computer applications and services that a respective user of a sub-profile has requested access privileges for. Typically, this information is provided via a web page from the server 110. On the same web page that shows a user's computer activities, the administrator may grant or deny access to the requested application or service (e.g., access to a web page). After the administrator modifies a user's access privileges, the configuration profile of the respective user is updated in the database 115 (at a present or subsequent time). Further, updating of the version of the configuration profile at the computer 106 also occurs at user login/logout, open of the Internet browser, or startup of the computer 106. Note, in other embodiments, requests for access privilege may be sent via email to a designated email address of the administrator.

Accordingly, in FIG. 14, if the administrator chooses the view requests selection button 1430, a user interface 1800 (in the form of a web page for this embodiment) for viewing requests to edit access restrictions is presented to the administrator, as shown in FIG. 18. Here, a user ("Annie") has generated requests 1820 asking for permission from the administrator to view a particular web site and requests 1830 asking for permission to access a variety of computer applications. By clicking on the web site name (e.g., www-.myschool.com), the administrator can preview the web site before deciding whether to grant the request for the user to view the web site.

In some embodiments, from the web pages provided by the server 110, the administrator also can view online reports on which applications, application services, network services, etc. (that are being regulated by the access control unit) have been accessed by each user via the World Wide Web. Such user reports are provided for each registered user of a sub-profile created by the administrator.

Each user report contains a detailed activity history of a respective user's use of services and applications on the general-purpose computer 106. In some embodiments, the administrator can view the previous 24 hours of activity ("yesterday"), the last 7 days of activity ("week"), and the last 30 days ("month") of activity with regard to these services and applications. Further, from these web pages provided by the server 110, the administrator can add services or applications to a user's allow list and/or block list. Since these online user reports are typically provided via web pages, the primary user can access the reports from any computer that has access to the World Wide Web. In alternative embodiments, user reports may be provided by another manner of Internet communication, such as email.

Figure 19:
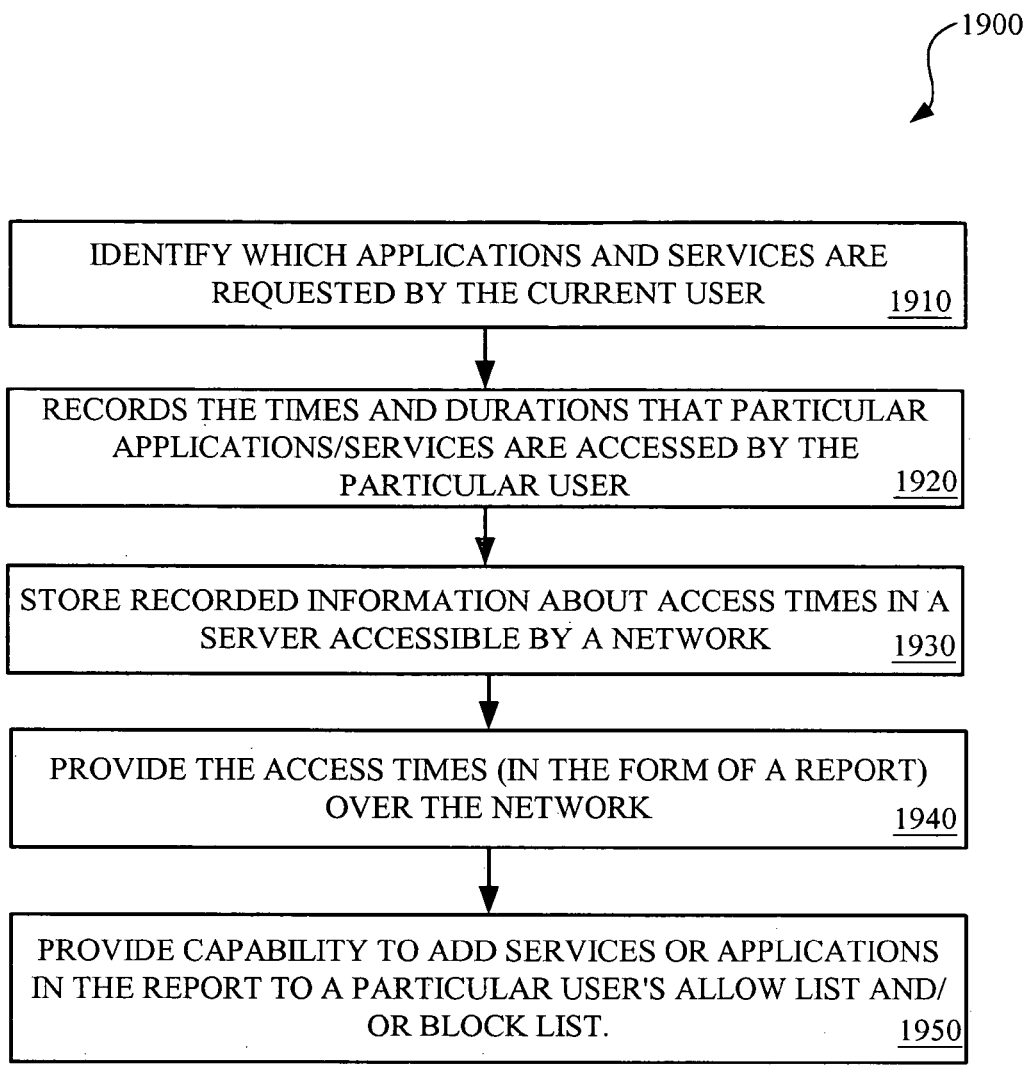
FIG. 19 is a flowchart illustrating one implementation of a method for providing user reports for the access control unit of FIG. 1.

FIG. 19 illustrates one implementation of a method 1900 for providing user reports to the administrator of the general-purpose computer 106. First, the access control unit identifies (1910) which applications and application services are attempted to be accessed by a current user. Correspondingly for each user of the general-purpose computer, the access control unit 155 locally records (1920) the duration or frequency of access for the requested application/service and whether access to the requested application/service was granted. The locally-stored information containing the user-access times are then transferred to a network server 110 and stored (1930) in the database 115 upon the occurrence of particular computer events as previously described with reference to FIG. 2 (e.g., log in, log out, start-up, activating an instance of an Internet browser, manual user command, etc.). In this way, current user-access times may be remotely accessed from the server 110 via the World Wide Web, for example.

As previously described, the server 110 provides (1940) the user-access times (in the form of an online report) for a particular user to the administrator over the network 120 via the World Wide Web. From the web pages provided by the server 110, the administrator also may view reports on which applications and services have been accessed by each user or have been denied access by each user via the World Wide Web. Plus, the administrator can add and/or remove (1950) applications and services that are listed in the report to/from a respective user's allow list and/or block list.

Figure 21:
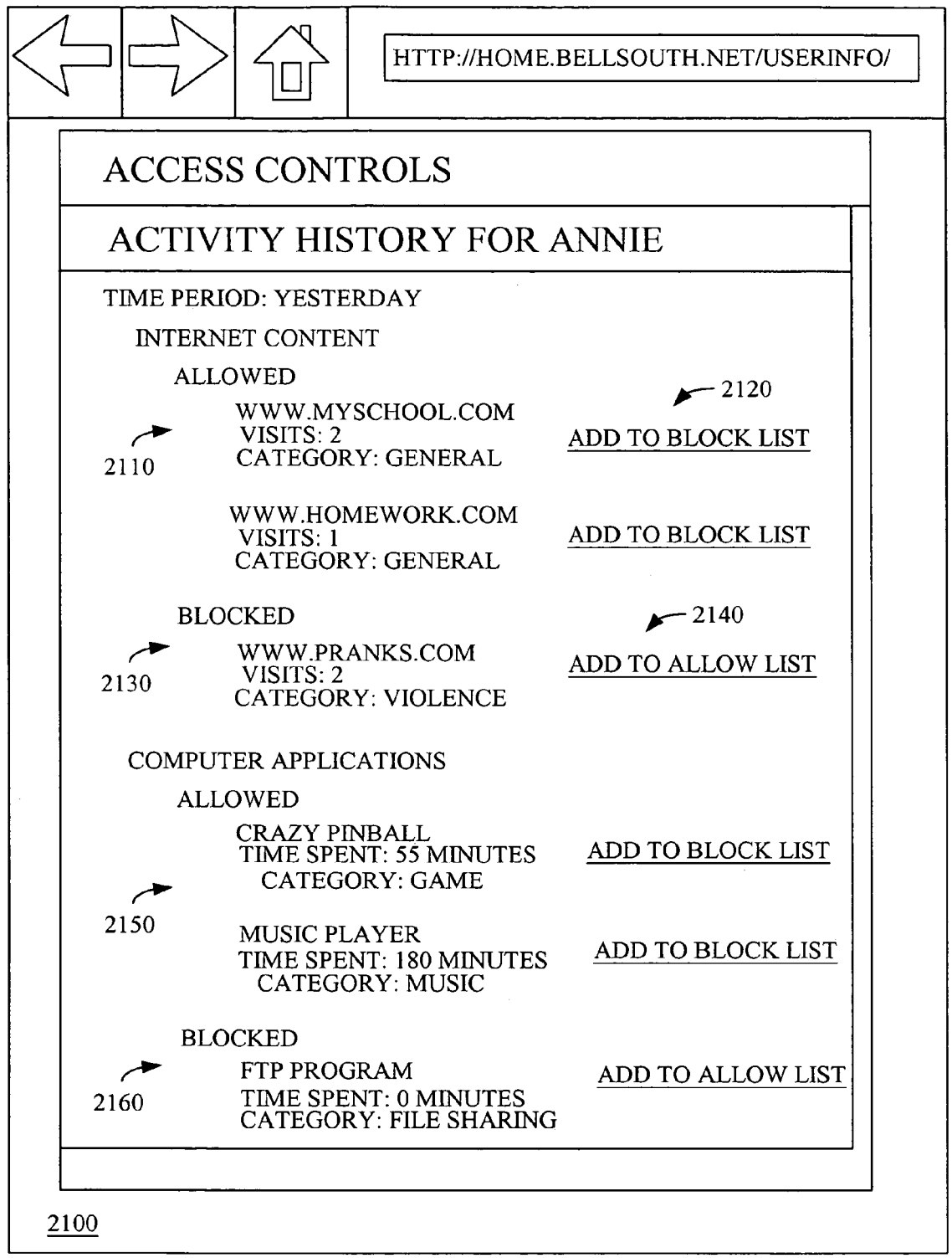
FIG. 21 is a screen diagram display of one embodiment of an activity history report for the access control unit of FIG. 1.

FIG. 20 is a screen diagram display of one embodiment 2000 of a user interface (in the form of a web page for this embodiment) for viewing a particular user activity history. As shown, an administrator is prompted to select a particular user and a range of time. Accordingly, after these selections are made, a report of the particular user's activities over the selected range of time is displayed to the administrator. FIG. 21 is a screen diagram display of one embodiment 2000 of an activity history report.

As shown in FIG. 21, the online report includes a list 2110 of Internet web sites that were visited by the respective user, the content-category of the respective web site, and how many times the sites were visited by the respective user over the selected range of time. In addition, a hypertext link 2120 is provided next to each web site so that the administrator can effortlessly add a visited web site to the respective user's block list (or blacklist) so that the respective user is no longer granted access to the web site. Also, a list 2130 of web sites are provided that the respective user was prohibited from accessing. Accordingly, a hypertext link 2140 is provided next to each prohibited web site to enable the administrator to add the web site to the respective user's allow list (or whitelist) so that the respective can access the web site in the future. A list 2150 of applications that are accessed by the respective user is also provided in the user's activity history along with an application-category type and the amount of time the respective user spent utilizing the application. Correspondingly, a list 2160 of applications that the respective user was blocked from accessing is also included.

In addition to designating which category types of applications and services may be accessed by a user, the administrator, via the access control unit 155, in some embodiments, can specify access time restrictions for prohibiting access to a particular application-category of services/applications (e.g., email, message boards, chat groups, file sharing, etc.), a particular service (e.g., web access to a website, receiving an Instant message from a particular sender, etc.), or a particular application (e.g., a computer game). Times may be specified by duration, such as two hours of access, or specific times of day, such as 5 p.m. to 8 p.m. Access times can also be specified per user and per categories. For example, the administrator may specify that a particular user can access a certain application-category of information for two hours daily and is not allowed to access a locally stored financial program at any time. Further, access time restrictions may be specified for a specified span of time (e.g., Monday through Wednesday, etc.).

FIG. 22 is a screen diagram display of one embodiment 2000 of a user interface (in the form of a web page for this embodiment)for viewing and editing access time restrictions. As shown in FIG. 22, the administrator may select from a list 2210 of application categories that include access to the Internet. When the administrator selects or highlights one of the categories, the current access time restrictions 2220 are displayed to the administrator. In this particular embodiment, the access time restrictions are displayed using a bar chart and the allowed times (that an application is allowed to be accessed) are shaded (or displayed in a different color) than the restricted times (that access to an application is blocked or restricted). In other embodiments, different representations may be used to show the access time restrictions.

Figure 23:
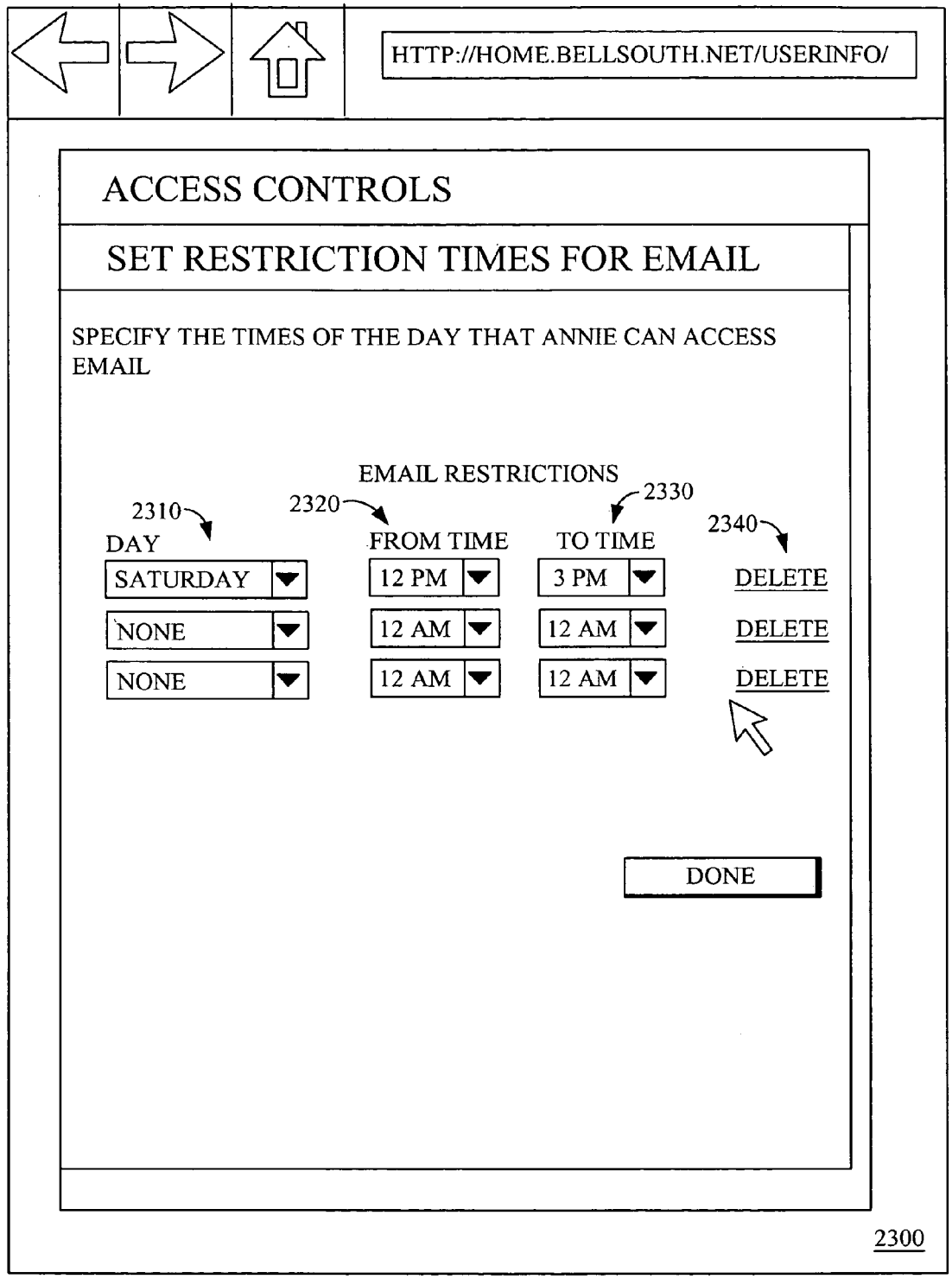
FIG. 23 is a screen diagram display of one embodiment of a user interface for setting access time restrictions for the access control unit of FIG. 1.

To edit the access time restrictions for an application-category, the administrator may choose the edit selection button 2230 next to the name of the application-category in the list 2210. The selection of the edit selection button 2230 launches or displays a user interface for setting the access time restrictions for the selected application. Accordingly, FIG. 23 is a screen diagram display of one embodiment 2300 of a user interface (in the form of a web page for this embodiment) for setting access time restrictions for email applications. In this embodiment, to specify a time frame that a user is allowed to access email applications, the administrator first selects a particular day (e.g., Saturday, weekend, weekdays, everyday, etc.) from a day selection box 2310. Then, the administrator selects a time (e.g., 12 p.m.) from a corresponding selection box 2320 to define the beginning of the access time frame for the respective user. Next, the administrator selects a time (e.g., 3 p.m.) from a corresponding selection box 2330 to define the end of the access time frame for the respective user. In a similar fashion, the administrator may specify additional access times (or time frames) that the respective user may access email applications. Although three sets of selection boxes are shown in the screen diagram display of FIG. 23, an additional set of selection boxes would be presented to the administrator if the previous sets of selection boxes had already been used to specify access time restrictions. To easily delete an access time window that the administrator has previously created, the administrator may select the delete link 2340 that is adjacent to the corresponding selection boxes for the access time frame.

Access time restrictions are stored in a user's configuration profile and may be accessed from the server 110 via the World Wide Web, as previously mentioned. Then, the access time restrictions are transferred. Note, a clock maintained at the server 110 is preferably used for timing purposes instead of a local clock on the general-purpose computer 106. In this way, a current user of the general-purpose computer 106 cannot manipulate local clock settings to avoid time restrictions initiated by the administrator. In some embodiments, a current user of the computer 106 who has been denied access due to a time restriction may request permission from the administrator for access in a similar manner as a user may request permission to access a prohibited category (e.g., application-category, content-category, etc.).

Figure 24:
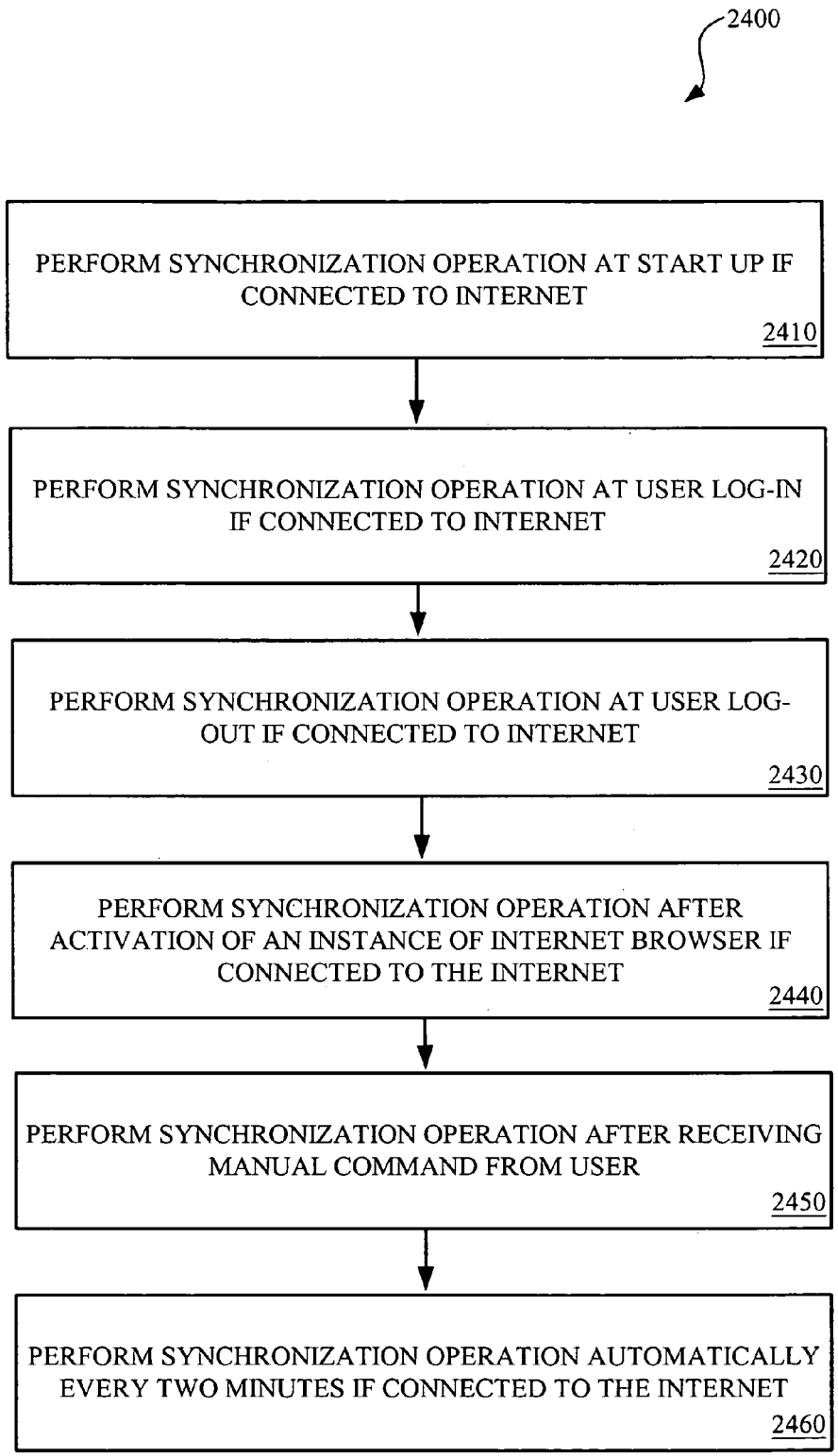
FIG. 24 is a flowchart illustrating one implementation of a method for synchronizing or coordinating the updating of contents of user-related information for the access control unit of FIG. 1.

FIG. 24 illustrates one implementation of a method 2400 for synchronizing or coordinating the updating of contents of user-related information (e.g., configuration profile, allow list, block list, user-access history, etc.) stored in the database 115 and the general-purpose computer 106. As previously described, information contained in configuration profiles stored on either the database 115 or the general-purpose may be modified by the access control unit 155. For example, an administrator may make changes to a user's configuration profile stored on the database 115 via the World Wide Web from any computer. Also, the access control unit 155 records the times and duration that a user accesses certain applications and/or application services. Accordingly, such user-related information is periodically synchronized so that the information contained within the database matches the information contained locally on the general-purpose computer.

The synchronization procedure or operation may be generally described as follows. Since the configuration profiles stored in the database 115 are typically the most current versions with regard to user-access restrictions, the access control unit 115 downloads the configuration profiles for each user from the database 115 if a change has occurred, so that the user-access restriction information contained in the versions of the configuration profiles locally stored on the general-purpose computer 106 can be updated. The access control unit 155 utilizes information contained in the local configuration profile(s) to control user-access to the general-purpose computer 106.

Referring to FIG. 24, upon start-up of the general-purpose computer, the access control unit 155 determines if the general-purpose computer 106 has an active connection on the network 120 (e.g., the Internet) and performs (2410) a synchronization operation if there is an active connection. For example, if the general-purpose computer 106 is actively connected to the Internet 120, the access control unit 155 synchronizes the configuration profile information contained within the general-purpose computer 106 with the configuration profile information contained in the database 115. If the general-purpose computer 106 is not connected to the Internet 120, then the access control unit 155 does not attempt the synchronization procedure.

Next, upon a user logging into the access control unit 155, the access control unit attempts to perform (2420) the synchronization procedure (as previously described). Likewise, if the access control unit cannot make a connection with the network 120 and the database 115, the synchronization operation is not performed. Further, upon a user logging off the access control unit 155, the access control unit also attempts to perform (2430) the synchronization procedure. The activation of an instance of an Internet browser may also cause the access control unit 155 to perform (2440) the synchronization procedure if the general-purpose computer 106 is actively connected to the Internet 120. Plus, a current user of the general-purpose computer 106 may manually enter a command for the synchronization procedure to be attempted to be performed (2450), as previously mentioned. Further, the access control unit 155 automatically performs (2460) the synchronization procedure periodically after a set period of time, such as two minutes, if the general-purpose computer 106 is actively connected to the Internet 120.

Typically, the access control unit 155 may be downloaded by a user as a separate software module. However, in some embodiments, the access control unit 155 may be integrated into other software applications such as an Internet browser 180 or other access control mechanisms, such as pop-up window blocking software. As a security feature, in some embodiments, the access control unit 155 is configured to allow registered users of the general-purpose computer 106 to have access to only a designated Internet browser so that communications from non-designated Internet browsers are intercepted and not processed. In this way, registered users cannot attempt to bypass access control measures by installing and running other Internet browsers. In other embodiments, software applications may be prohibited from being utilized by a user of a general-purpose computer. Accordingly, a provider of computer application software can ensure that specific models of software are used in collaboration with the computer application software.

Since user settings on stored remotely in a database 115 for the access control unit, the access control unit 155 may be installed on more than one general-purpose computer without having to re-configure user settings. Thus, the user settings that are remotely stored may be transferred to an additional computer, and an administrator can control which applications and services are being accessed by a user on more than one computer.

Any process descriptions or blocks in flow charts should be understood as representing steps in the process, and alternate implementations are included within the scope of the embodiments of the present disclosure in which steps may be executed out of order from that shown or discussed, including substantially concurrently or in reverse order, depending on the functionality involved, as would be understood by those reasonably skilled in the art of the present disclosure.

It should be emphasized that the above-described embodiments are merely possible examples of implementations, merely set forth for a clear understanding of the principles of the disclosure. Many variations and modifications may be made to the above-described embodiment(s) without departing substantially from the spirit and principles herein. For example, some embodiments may be based on restricting computer software applications; some embodiments may be based on restricting Internet communications; and others may be based on a combination of restricting computer software applications and Internet communications. In addition, user interfaces for the access control unit 155 are not limited to web-based interfaces and may be varied from the examples contained herein. All such modifications and variations are-intended to be included herein within the scope of this disclosure.

Therefore, having thus described the invention, at least the following is claimed:

1. A system to control computer access, comprising:
   at least one user profile having settings customized for a respective user of a computer, the settings specifying types of information that the user is authorized to access via the computer;
   a database for storing the at least one user profile, the database being in a remote location from the computer;
   a server for communicating with the database, the server being accessible from the Internet, wherein the at least one user profile is accessible by the server; and
   a control unit for controlling access to the computer in accordance with the at least one user profile, wherein an administrator of the computer is enabled to remotely access and modify the at least one user profile.

2. The system of claim 1, wherein the settings include an allow list of Internet addresses that the administrator authorized the respective user to access on the computer.

3. The system of claim 1, wherein the settings include a block list of Internet addresses that the administrator prohibits the respective user to access on the computer.

4. The system of claim 1, wherein the settings include a list of categories of information that the administrator prohibits the respective user to access on the computer.

5. The system of claim 1, wherein the settings include a particular computer application on the computer that the administrator prohibits the respective user to access on the computer.

6. The system of claim 1, wherein the administrator modifies access privileges for the respective user via the World Wide Web.

7. A system to control computer access, comprising:
   means for creating at least one user profile having settings customized for a respective user of a computer, the settings specifying types of information that the user is authorized to access on the computer;
   means for remotely storing the at least one user profile;
   means for remotely accessing information contained in the at least one user profile; and
   means for controlling access to the computer in accordance with the at least one user profile.

8. The system of claim 7, further comprising:
   means for authorizing, in the settings, the respective user to access an allow list of Internet addresses on the computer.

9. The system of claim 7, further comprising:
   means for prohibiting, in the settings, the respective user to access a block list of Internet addresses on the computer.

10. The system of claim 7, further comprising:
    means for prohibiting, in the settings, the respective user to access a list of categories of information on the computer.

11. The system of claim 7, further comprising:
    means for prohibiting, in the settings, a particular computer application on the computer.

12. The system of claim 7, further comprising:
    means for modifying access privileges for the respective user via the World Wide Web.

13. A method to control computer access, comprising:
    creating at least one user profile having settings customized for a respective user of a computer, the settings specifying types of information that the user is authorized to access on the computer;
    remotely storing the at least one user profile;
    remotely accessing information contained in the at least one user profile; and
    controlling access to the computer in accordance with the at least one user profile.

14. The method of claim 13, further comprising:
    authorizing, in the settings, the respective user to access an allow list of Internet addresses on the computer.

15. The method of claim 13, further comprising:
    prohibiting, in the settings, the respective user to access a block list of Internet addresses on the computer.

16. The method of claim 13, further comprising:
    prohibiting, in the settings, the respective user to access a list of categories of information on the computer.

17. The method of claim 13, further comprising:
    prohibiting, in the settings, a particular computer application on the computer.

18. The method of claim 13, further comprising:
    modifying access privileges for the respective user via the world wide web.

19. A computer-readable medium for storing a program that controls computer access to Internet content, the program comprising:
    creating at least one user profile having settings customized for a respective user of a computer, the settings specifying types of information that the user is authorized to access on the computer;
    remotely storing the at least one user profile;
    remotely accessing information contained in the at least one user profile; and
    controlling access to the computer in accordance with the at least one user profile.

20. The medium of claim 19, the program further comprising:
    authorizing, in the settings, the respective user to access an allow list of Internet addresses on the computer.

21. The medium of claim 19, the program further comprising:
    prohibiting, in the settings, the respective user to access a block list of Internet addresses on the computer.

22. The medium of claim 19, the program further comprising:
    prohibiting, in the settings, the respective user to access a list of categories of information on the computer.

23. The medium of claim 19, the program further comprising:
    prohibiting, in the settings, a particular computer application on the computer.

24. The medium of claim 19, the program further comprising:
    modifying access privileges for the respective user via the World Wide Web.

* * * * *